US012174448B2

(12) United States Patent
Skrocki

(10) Patent No.: US 12,174,448 B2
(45) Date of Patent: Dec. 24, 2024

(54) VEHICULAR CAMERA ASSEMBLY PROCESS USING WELDING TO SECURE LENS RELATIVE TO CAMERA IMAGE PLANE

(71) Applicant: Magna Electronics Inc., Auburn Hills, MI (US)

(72) Inventor: Gavin E. Skrocki, Bay City, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 230 days.

(21) Appl. No.: 17/817,021

(22) Filed: Aug. 3, 2022

(65) Prior Publication Data

US 2022/0373762 A1 Nov. 24, 2022

Related U.S. Application Data

(63) Continuation-in-part of application No. 17/303,784, filed on Jun. 8, 2021, now Pat. No. 11,635,672.

(60) Provisional application No. 63/261,531, filed on Sep. 23, 2021, provisional application No. 63/203,898, filed on Aug. 4, 2021, provisional application No. 62/706,799, filed on Sep. 11, 2020, provisional application No. 62/705,028, filed on Jun. 8, 2020.

(51) Int. Cl.
G02B 7/02 (2021.01)
G03B 30/00 (2021.01)

(52) U.S. Cl.
CPC ............ *G02B 7/025* (2013.01); *G03B 30/00* (2021.01)

(58) Field of Classification Search
CPC ........ G03B 17/12; G03B 30/00; G02B 27/62; H04N 5/2253; H04N 5/2254
See application file for complete search history.

(56) References Cited

U.S. PATENT DOCUMENTS

| | | |
|---|---|---|
| 5,412,510 A | 5/1995 | Iizuka et al. |
| 5,550,677 A | 8/1996 | Schofield et al. |
| 5,670,935 A | 9/1997 | Schofield et al. |
| 5,949,331 A | 9/1999 | Schofield et al. |
| 5,978,017 A | 11/1999 | Tino |
| 6,151,065 A | 11/2000 | Steed et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,595,943 B2 | 9/2009 | Yuan |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,256,821 B2 | 9/2012 | Lawlor et al. |

(Continued)

*Primary Examiner* — Noam Reisner
(74) *Attorney, Agent, or Firm* — HONIGMAN LLP

(57) ABSTRACT

A vehicular camera assembly includes an imager printed circuit board (imager PCB) having an imager disposed at a first side of the imager PCB. A lens barrel accommodates a lens and has an inner end. The inner end of the lens barrel is disposed at a first portion of a camera housing. The imager PCB is attached at a second portion of the camera housing that joins with the first portion so that the imager faces the lens. The second portion is adjustable relative to the first portion to align the imager and the lens. With the second portion engaging the first portion and the imager and lens aligned, a weld washer is laser welded to the first and second portions to join the second portion to the first portion.

21 Claims, 26 Drawing Sheets

(56) References Cited

U.S. PATENT DOCUMENTS

| | | |
|---|---|---|
| 8,542,451 B2 | 9/2013 | Lu et al. |
| 8,994,878 B2 | 3/2015 | Byrne et al. |
| 9,077,098 B2 | 7/2015 | Latunski |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,621,769 B2 | 4/2017 | Mai et al. |
| 9,871,971 B2 | 1/2018 | Wang et al. |
| 9,896,039 B2 | 2/2018 | Achenbach et al. |
| 10,142,532 B2 | 11/2018 | Mleczko |
| 10,207,646 B2 | 2/2019 | Oh |
| 10,230,875 B2 | 3/2019 | Mleczko et al. |
| 10,250,004 B2 | 4/2019 | Conger et al. |
| 10,264,219 B2 | 4/2019 | Mleczko et al. |
| 10,272,857 B2 | 4/2019 | Conger et al. |
| 10,274,812 B1 | 4/2019 | Chen |
| 10,676,041 B2 | 6/2020 | Sesti et al. |
| 11,635,672 B2 | 4/2023 | Sesti et al. |
| 2001/0055073 A1 | 12/2001 | Shinomiya |
| 2003/0090569 A1 | 5/2003 | Poechmueller |
| 2003/0128291 A1 | 7/2003 | Harazono et al. |
| 2004/0069998 A1 | 4/2004 | Harazono |
| 2006/0049154 A1* | 3/2006 | Clifford, Jr. ............ B29C 66/54 219/121.64 |
| 2007/0058964 A1 | 3/2007 | Shangguan et al. |
| 2007/0146908 A1 | 6/2007 | Li |
| 2007/0200053 A1 | 8/2007 | Nomura et al. |
| 2009/0244361 A1 | 10/2009 | Gebauer et al. |
| 2011/0025850 A1 | 2/2011 | Maekawa et al. |
| 2011/0279675 A1 | 11/2011 | Mano et al. |
| 2011/0298925 A1 | 12/2011 | Inoue et al. |
| 2012/0019940 A1 | 1/2012 | Lu et al. |
| 2013/0130937 A1 | 5/2013 | Sun et al. |
| 2013/0183499 A1 | 7/2013 | Kido et al. |
| 2013/0242099 A1 | 9/2013 | Sauer et al. |
| 2014/0298642 A1 | 10/2014 | Sesti et al. |
| 2014/0373345 A1 | 12/2014 | Steigerwald |
| 2015/0015713 A1 | 1/2015 | Wang et al. |
| 2015/0029337 A1 | 1/2015 | Uchiyama et al. |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2015/0379361 A1 | 12/2015 | Boulanger |
| 2016/0037028 A1 | 2/2016 | Biemer |
| 2016/0191863 A1 | 6/2016 | Minikey, Jr. et al. |
| 2016/0243987 A1 | 8/2016 | Kendall |
| 2016/0268716 A1 | 9/2016 | Conger et al. |
| 2016/0284752 A1 | 9/2016 | Shi |
| 2016/0286103 A1 | 9/2016 | Van Dan Elzen |
| 2017/0036600 A1 | 2/2017 | Whitehead et al. |
| 2017/0054881 A1 | 2/2017 | Conger et al. |
| 2017/0126938 A1 | 5/2017 | Newiger |
| 2017/0129419 A1 | 5/2017 | Conger et al. |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2018/0027151 A1 | 1/2018 | Kazama et al. |
| 2018/0033741 A1 | 2/2018 | Dubey et al. |
| 2018/0042106 A1 | 2/2018 | Scheja |
| 2018/0072239 A1 | 3/2018 | Wienecke et al. |
| 2018/0098033 A1 | 4/2018 | Mleczko et al. |
| 2018/0364441 A1 | 12/2018 | Hubert et al. |
| 2019/0052782 A1* | 2/2019 | Sung ..................... G03B 17/12 |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0129281 A1 | 5/2019 | Chen |
| 2019/0166289 A1 | 5/2019 | Knutsson et al. |
| 2019/0306966 A1 | 10/2019 | Byrne et al. |
| 2019/0355606 A1 | 11/2019 | Flotgen |
| 2020/0001787 A1 | 1/2020 | Lu et al. |
| 2020/0010024 A1 | 1/2020 | Sesti et al. |
| 2020/0033549 A1 | 1/2020 | Liu et al. |
| 2020/0070453 A1 | 3/2020 | Piotrowski et al. |
| 2020/0099837 A1 | 3/2020 | Diesel |
| 2020/0137926 A1 | 4/2020 | Wohlte |
| 2020/0154020 A1 | 5/2020 | Byrne et al. |
| 2020/0172019 A1 | 6/2020 | Ding et al. |
| 2020/0204711 A1 | 6/2020 | Guidi et al. |
| 2020/0333619 A1 | 10/2020 | Ang et al. |
| 2020/0412925 A1 | 12/2020 | Byrne et al. |
| 2021/0072621 A1* | 3/2021 | Faridian ................ G03B 17/12 |
| 2021/0103119 A1 | 4/2021 | Reckker et al. |
| 2021/0382375 A1 | 12/2021 | Sesti et al. |

* cited by examiner

VEHICULAR CAMERA ASSEMBLY PROCESS USING WELDING TO SECURE LENS RELATIVE TO CAMERA IMAGE PLANE

CROSS REFERENCE TO RELATED APPLICATIONS

The present application claims the filing benefits of U.S. provisional application Ser. No. 63/261,531, filed Sep. 23, 2021, and U.S. provisional application Ser. No. 63/203,898, filed Aug. 4, 2021, which are hereby incorporated herein by reference in their entireties. The present application also is a continuation-in-part of U.S. patent application Ser. No. 17/303,784, filed Jun. 8, 2021, which claims the filing benefits of U.S. provisional application Ser. No. 62/706,799, filed Sep. 11, 2020, and U.S. provisional application Ser. No. 62/705,028, filed Jun. 8, 2020, which are all hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

A driver assistance system or vision system or imaging system for a vehicle utilizes one or more cameras to capture image data representative of images exterior of the vehicle. The camera includes a lens holder and an imager printed circuit board (imager PCB), with the imager PCB fixed to the lens holder, and with a lens barrel (accommodating a lens or lens assembly therein) attached at the lens holder.

A vehicular camera assembly includes an imager printed circuit board (PCB) that includes a first side and a second side opposite the first side and separated from the first side by a thickness of the imager PCB. An imager is disposed at the first side of the imager PCB. The camera further includes a lens barrel that accommodates a lens and has an inner end. A lens holder or first portion of a camera housing receives the inner end of the lens barrel. A rear or second portion of the camera housing receives the imager PCB at an inner surface of the rear housing and engages the lens holder so that the imager of the imager PCB faces the lens. With the rear housing engaging the lens holder, the rear housing is adjustable relative to the lens holder to optically align and focus the imager and the lens. With the rear housing engaging the lens holder, a weld washer is disposed around an outer surface of the rear housing and at the lens holder. With the weld washer disposed around the outer surface of the rear housing and at the lens holder and with the imager and the lens optically aligned and focused, the weld washer is laser welded to the rear housing and the lens holder to secure the rear housing to the lens holder.

Optionally, the rear housing may comprise a round or circular or cylindrical rear housing and the weld washer may comprise a correspondingly round or circular or cylindrical weld washer. Such a configuration of the rear housing and weld washer may improve tolerances between the weld washer and rear cover and improve accuracy of the laser welding process. Optionally, the weld washer may be tack welded to the rear housing and lens holder to secure the rear housing to the lens holder during a first laser welding step and further laser welded to the rear housing and lens holder to seal the camera assembly during a second laser welding step.

A vehicular camera includes an imager printed circuit board (PCB), a lens barrel, a lens holder, and a rear housing. The imager PCB includes a first side and a second side opposite the first side and separated from the first side by a thickness of the imager PCB. An imager is disposed on the first side of the imager PCB. The lens barrel accommodates a lens and has an inner end. The lens barrel has a radial protrusion (and optionally two radial protrusions) protruding radially outward at or near the inner end of the lens barrel. The lens holder receives the inner end of the lens barrel. The lens holder has a slot (and optionally two slots) extending longitudinally along the lens holder from an engaging end of the lens holder. The rear housing receives the imager PCB and engages the engaging end of the lens holder so that the imager at the first side of the imager PCB faces the lens. The lens barrel is received in the lens holder such that the radial protrusion (or radial protrusions) of the lens barrel is disposed within the slot (or slots) of the lens holder. The lens holder is adjustable relative to the rear housing to at least partially optically align and focus the imager and the lens. The radial protrusion is movable within the slot and the lens holder is movable relative to the rear housing while the lens barrel is adjusted relative to the imager to at least partially optically align and focus the imager and the lens. With the lens at least partially optically aligned and focused relative to the imager, the lens holder is welded (such as laser welded) to the rear housing to secure the lens holder relative to the rear housing. With the lens optically aligned and focused relative to the imager, the radial protrusion within the slot is welded (such as laser welded) to the lens holder to secure the lens barrel relative to the imager PCB.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data. Optionally, the vision system may provide display, such as a rearview display or a top down or bird's eye or surround view display or the like.

Figure 1:
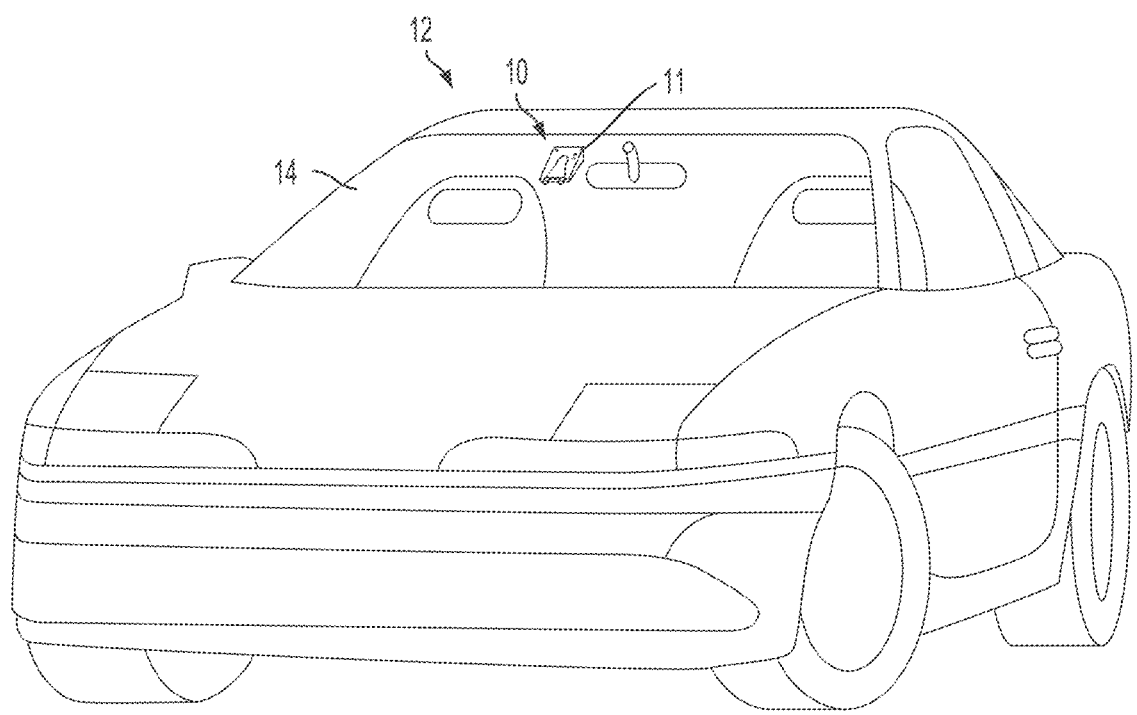
FIG. 1 is a perspective view of a vehicle with a vision system that incorporates a camera.
Figure 3:
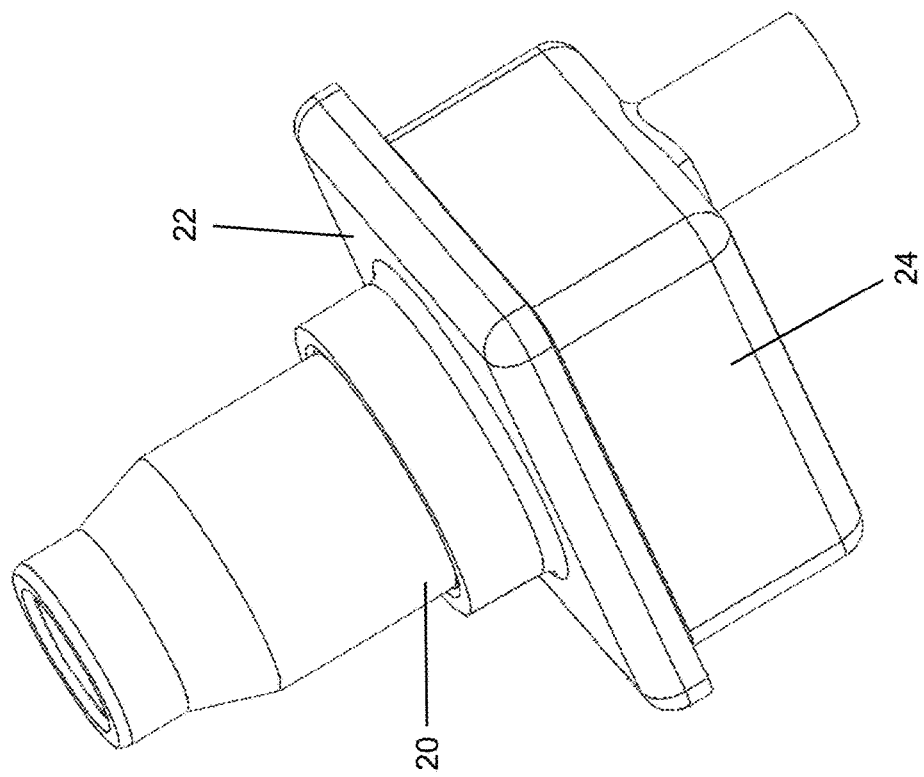
FIG. 3 is a perspective view of the camera assembly of FIG. 2 without the weld washer.
Figure 2:
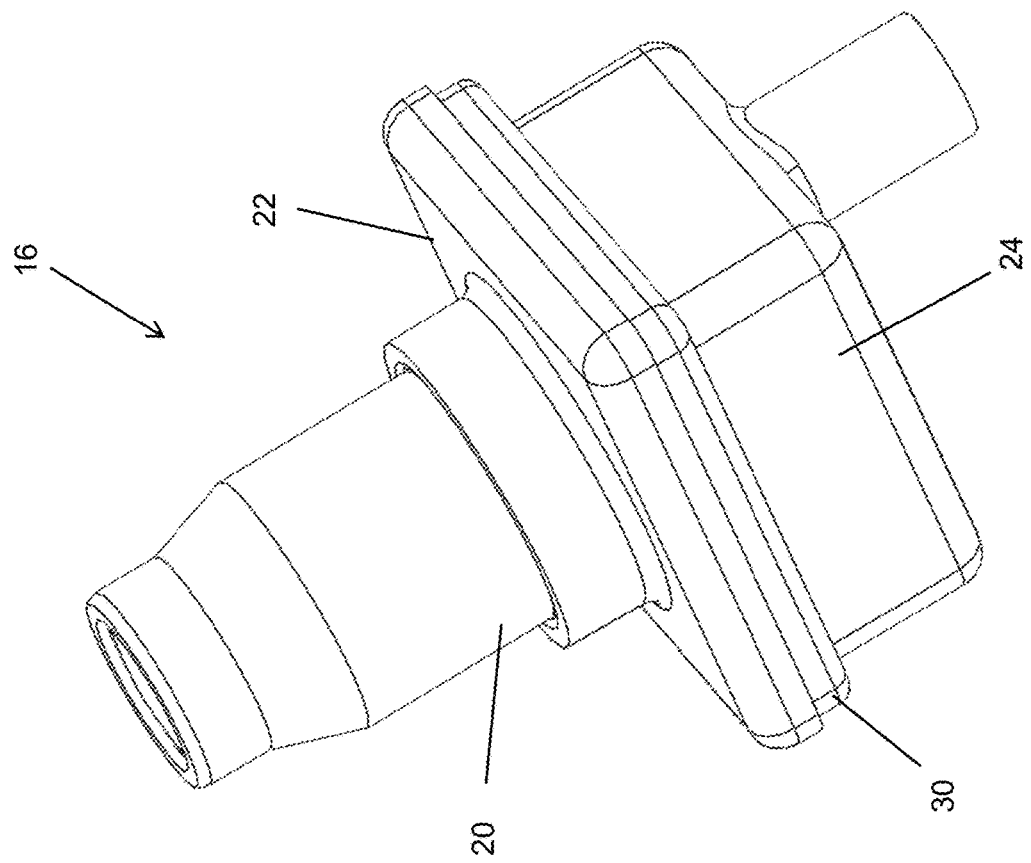
FIG. 2 is a perspective view of a camera assembly with a weld washer.
Figure 4:
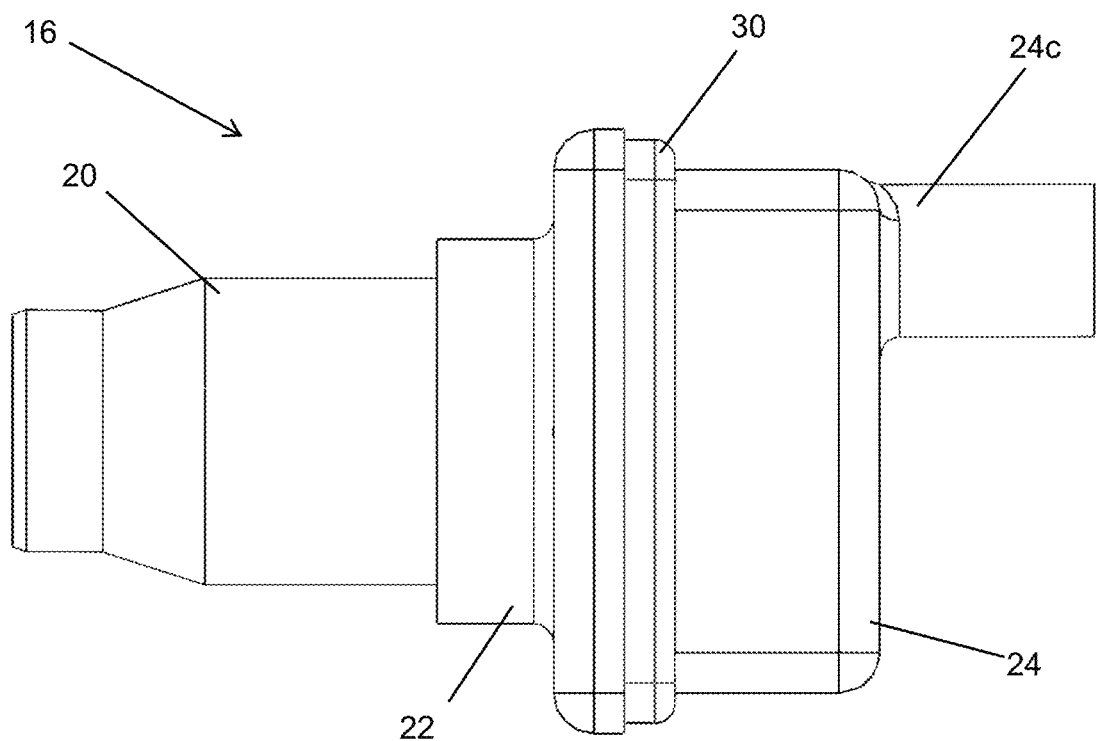
FIG. 4 is a side view of the camera assembly of FIG. 2 with the weld washer.
Figure 5:
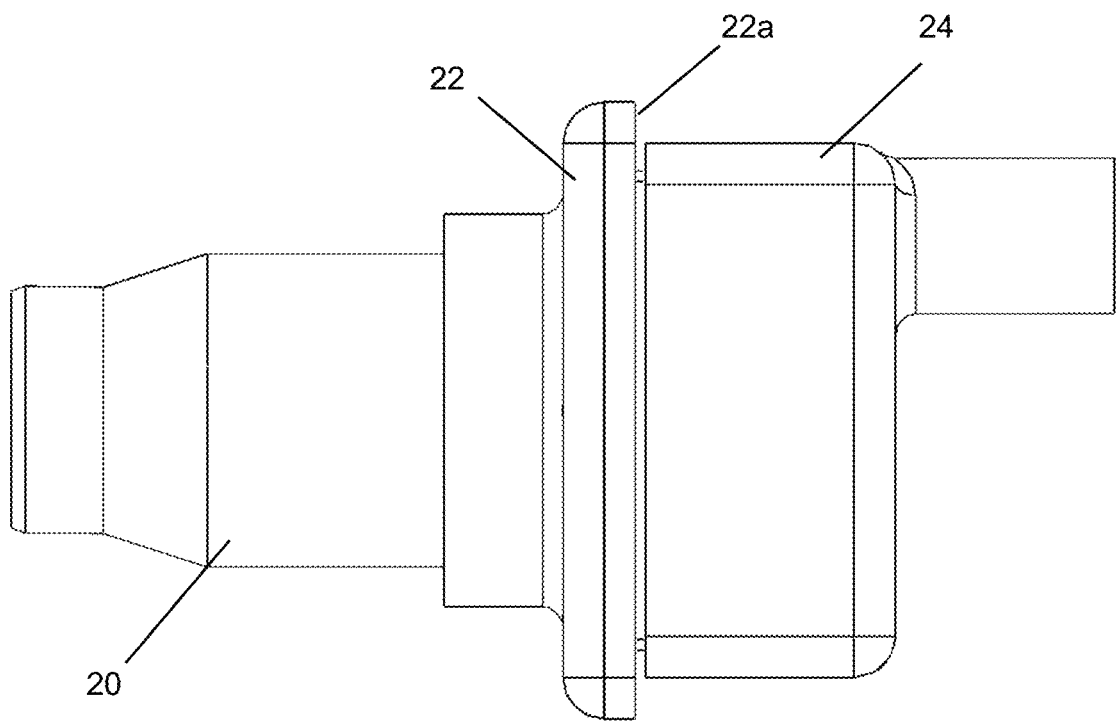
FIG. 5 is a side view of the camera assembly of FIG. 2 without the weld washer.
Figure 6:
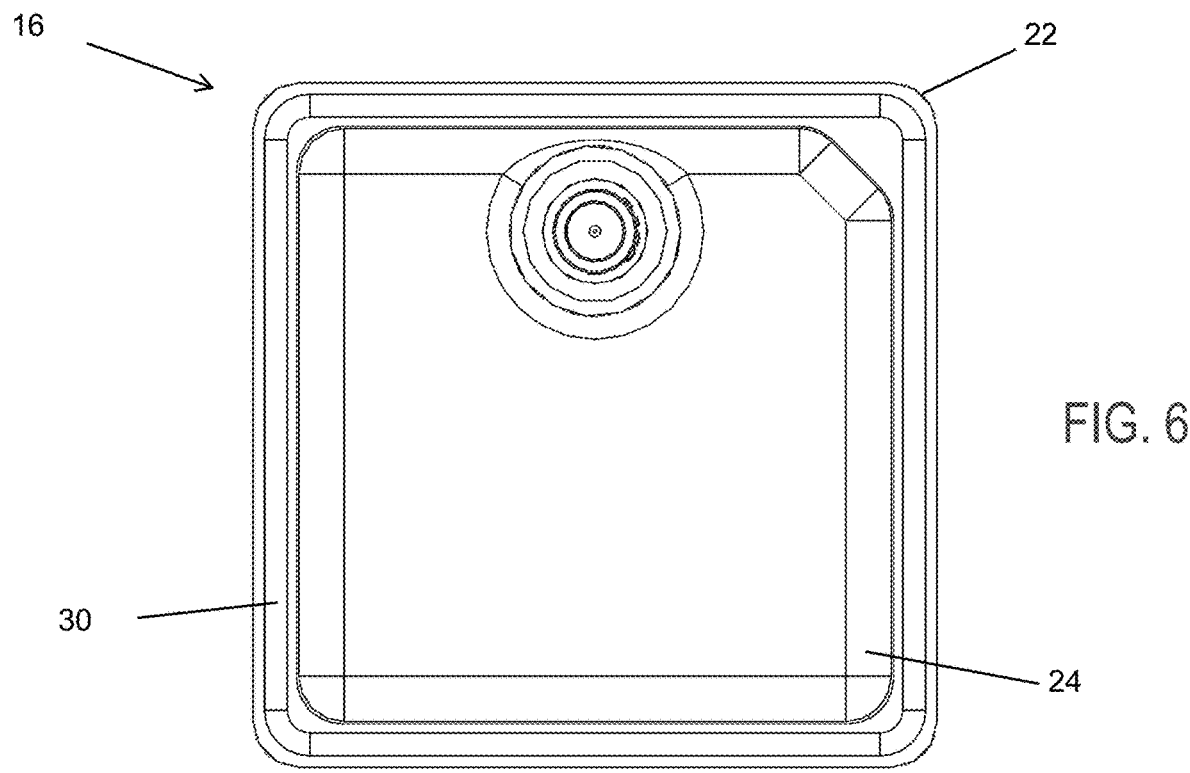
FIG. 6 is a rear view of the camera assembly of FIG. 2 with the weld washer.
Figure 7:
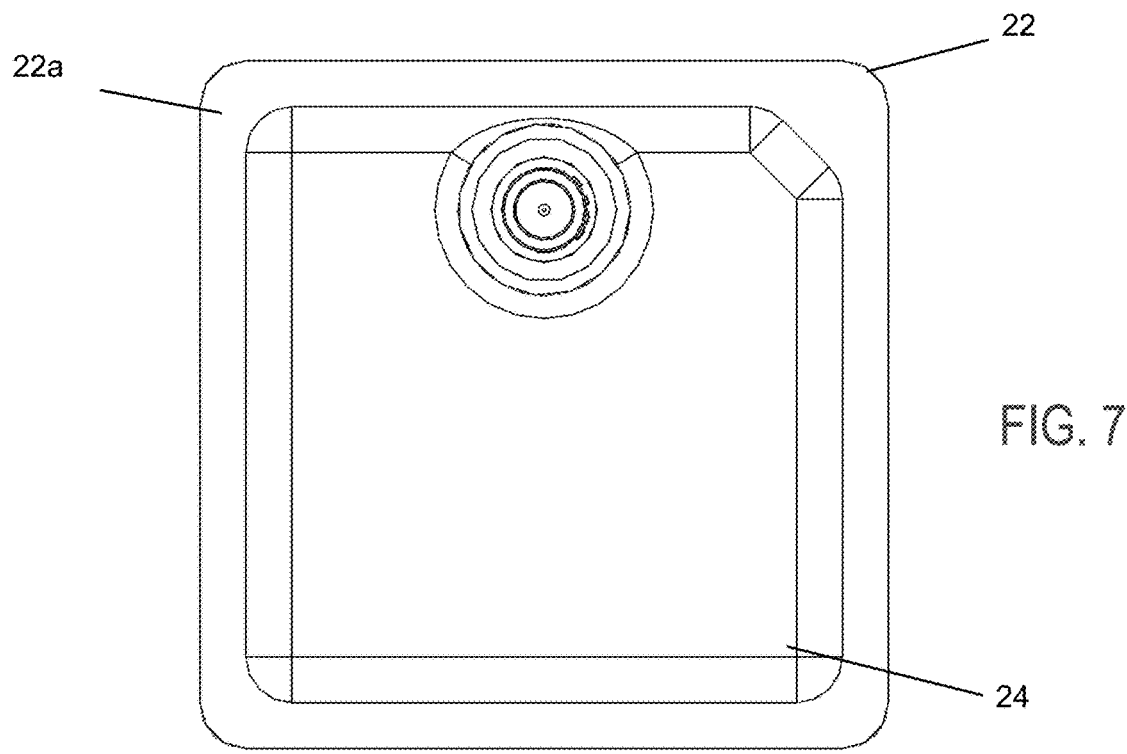
FIG. 7 is a rear view of the camera assembly of FIG. 2 without the weld washer.
Figure 8:
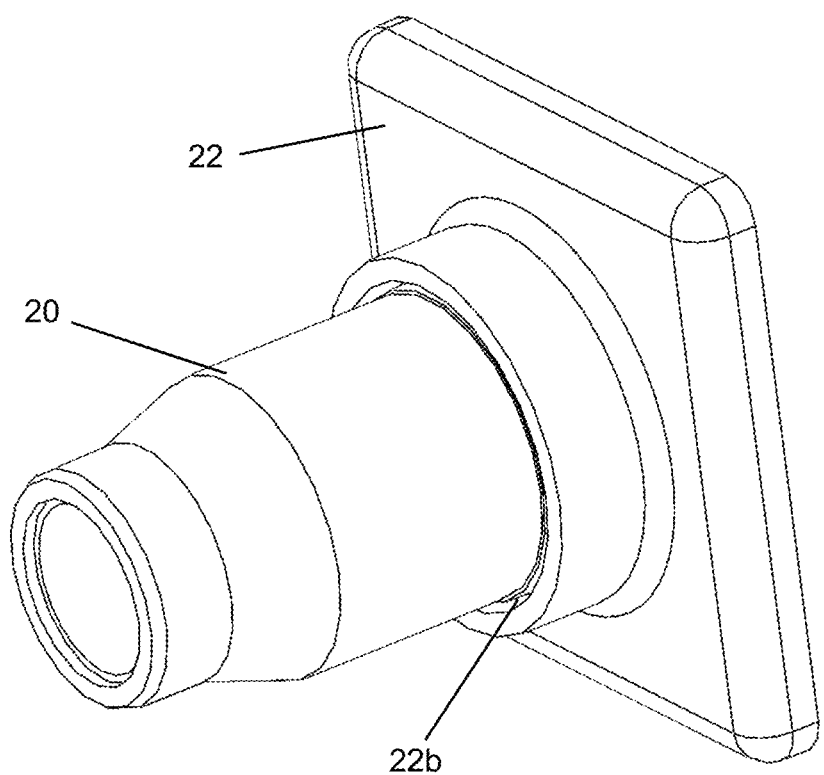
FIGS. 8 and 9 are perspective views of the lens holder subassembly.
Figure 9:
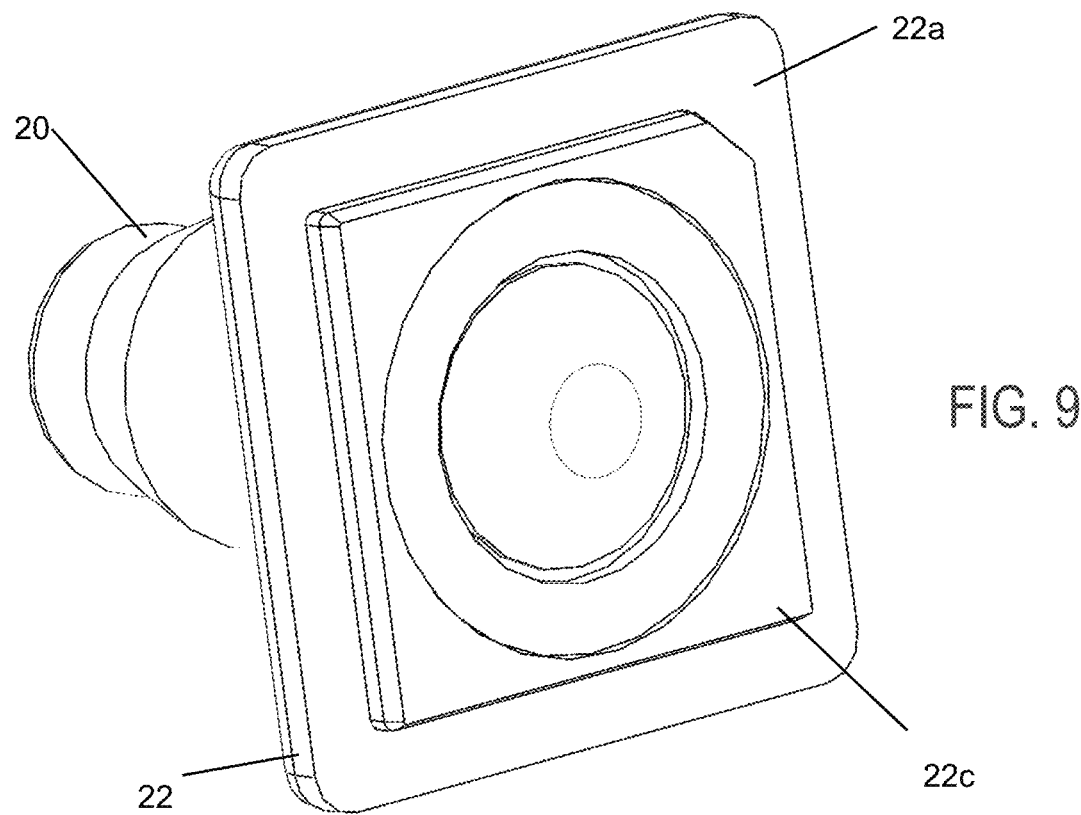
Figure 10:
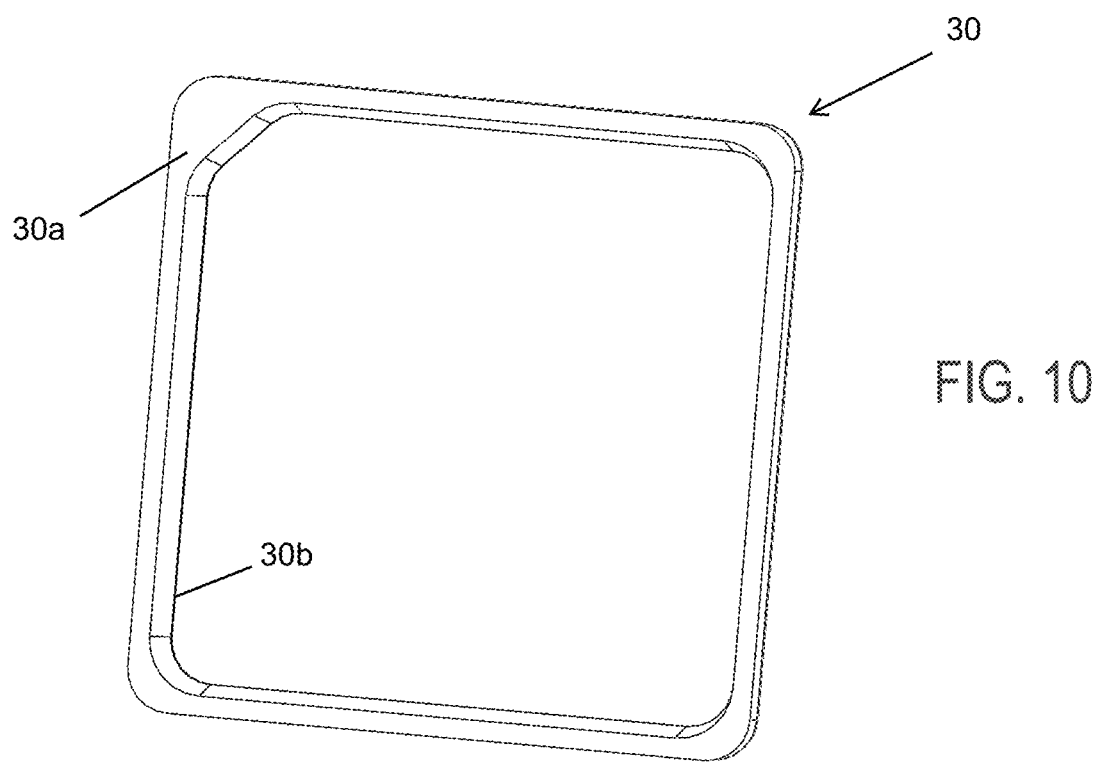
FIGS. 10 and 11 are perspective views of the weld washer.
Figure 11:
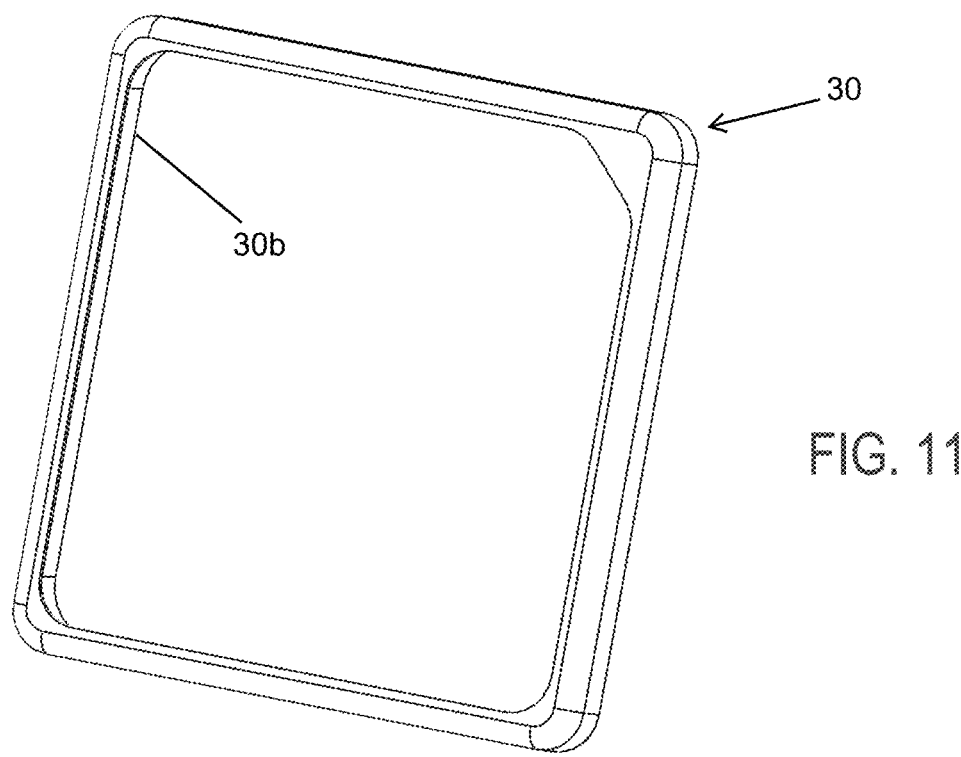
Figure 12:
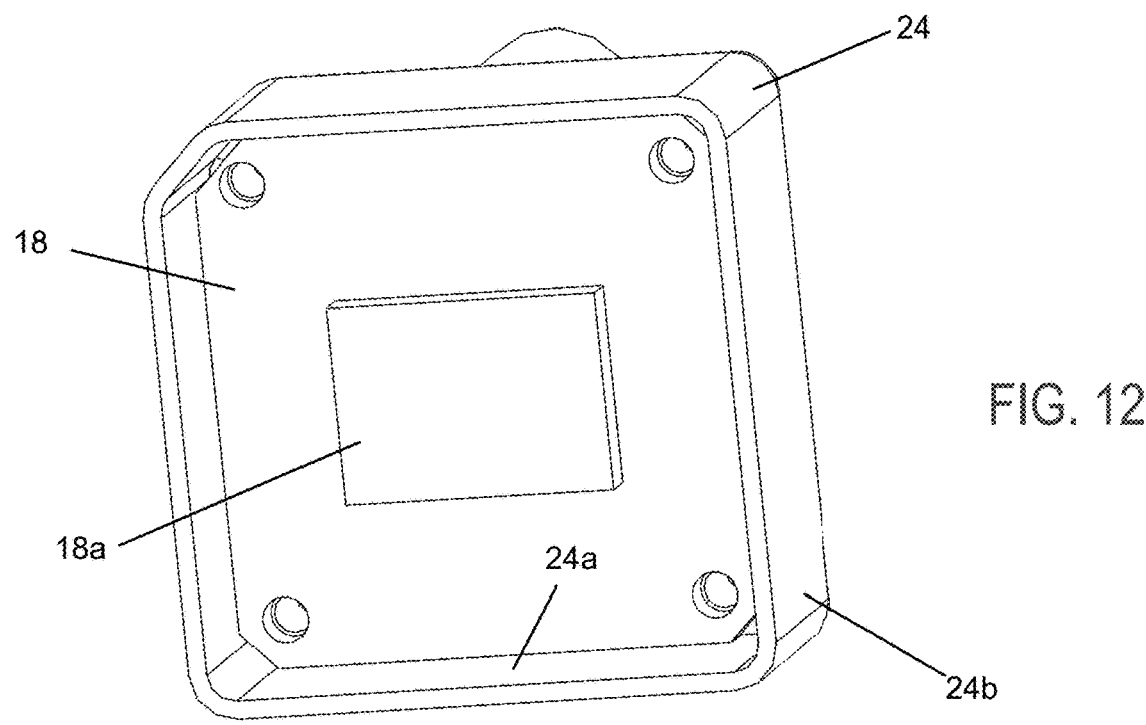
FIG. 12 is a perspective view of the rear housing and imager PCB subassembly.
Figure 13:
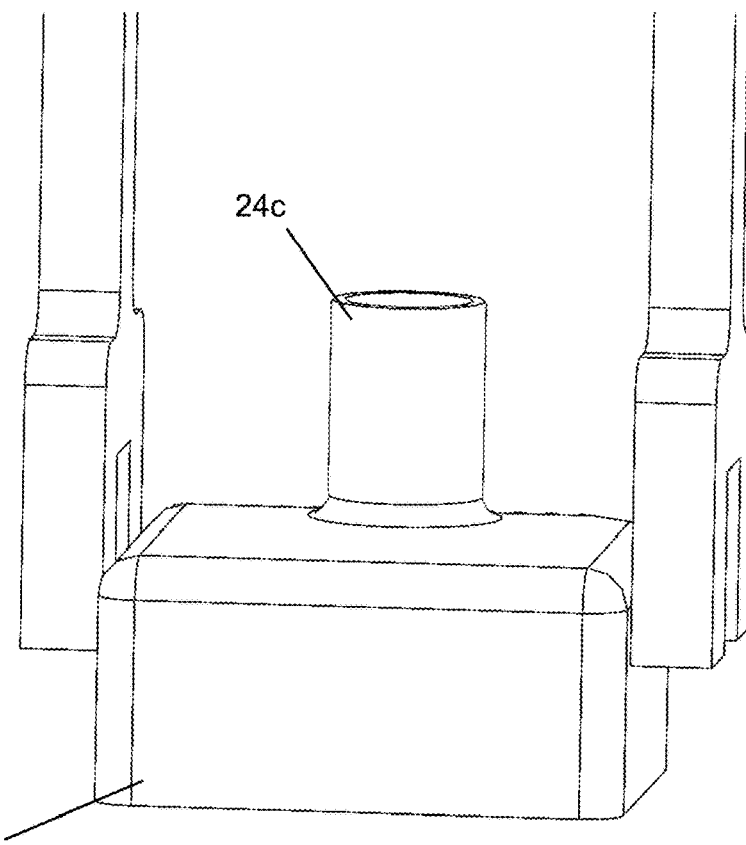
FIG. 13 is a perspective view of the rear housing as grasped by the grippers.
Figure 15:
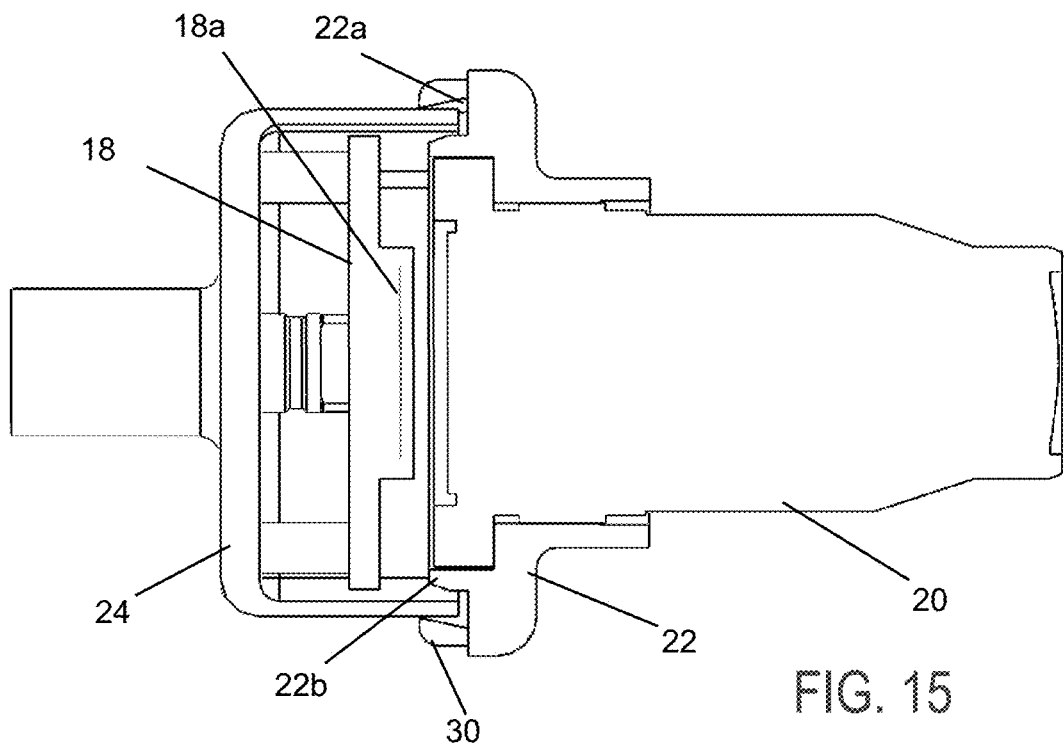
FIG. 15 is a cross sectional view of the camera assembly of FIG. 2.
Figure 14:
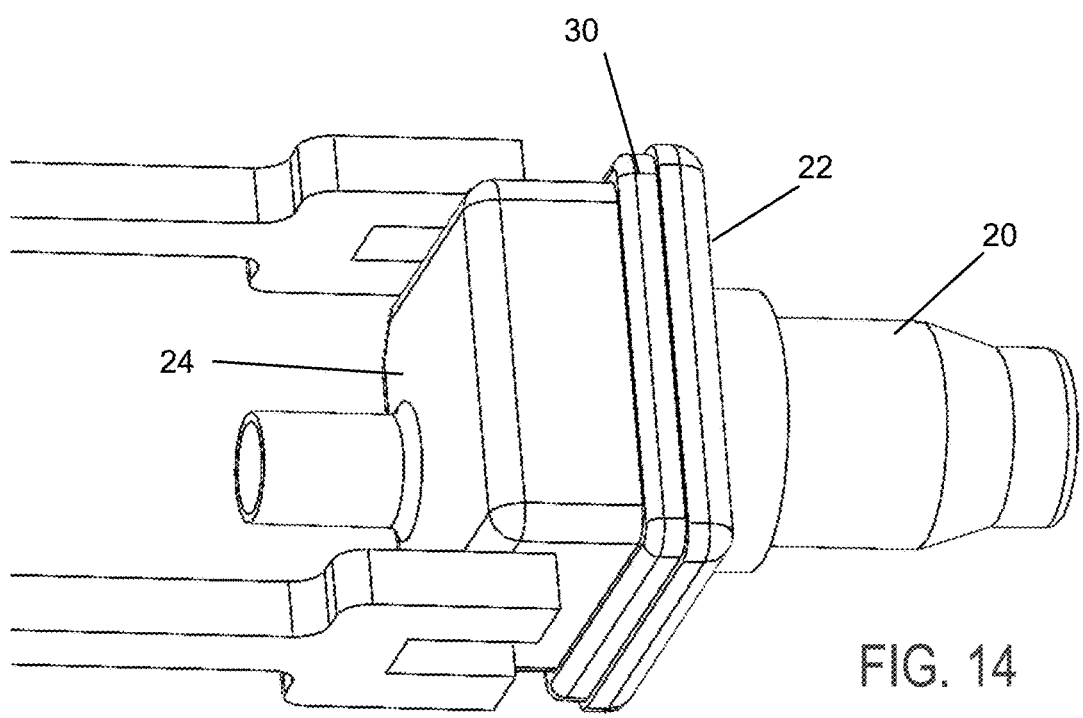
FIG. 14 is a perspective view of the camera assembly, with the rear housing grasped and adjusted by grippers to optically align the imager disposed at the rear housing with the lens of the lens holder subassembly.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) 11 having electronic circuitry and associated software, with the electronic circuitry including a data processor or image processor that is operable to process image data captured by the camera or cameras. The vision system 10, via processing of captured image data at the ECU 11, may detect or determine presence of objects or the like and/or the system provide displayed images at a display device for viewing by the driver of the vehicle. The data transfer or signal communication from the camera to the ECU 11 may comprise any suitable data or communication link, such as a vehicle network bus or the like of the equipped vehicle.

Typically, active focus and alignment is used to set and secure a focal position of a lens to an imager component. However, this leads to expensive and complicated measures to manage the compliance tolerances created by camera components and manufacturing focus/alignment processes. For example, a camera may be assembled using an active PCB alignment, which may use screws to secure the PCB to a lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the lens holder or front housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. Optionally, the adhesive may be at least partially cured via ultraviolet (UV) light and may further be cured via additional curing. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the front housing or lens holder utilizing adhesive initially, and then the imager PCB is actively moved relative to the lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV and additional curing. This curing increases the tolerance stack of the finished assembly.

Referring now to FIGS. 2-15, a build assembly process for assembling a vehicular camera 16 adjusts a rear housing 24 and imager PCB 18 relative to a lens holder 22 and lens assembly 20 to align and focus the lens relative to the imager 18*a*, and then utilizes laser welding to secure the rear housing 24 relative to the lens holder 22, such as via a weld washer disposed at the rear housing—lens holder interface. The focus and alignment process allows for all degrees of freedom to be compensated for by adjusting the PCB 18 and rear housing 24 relative to the lens holder 22 for alignment and focus of the lens relative to the imager 18*a*.

The imager PCB 18 having the imager 18*a* disposed thereat is attached at the rear housing 24 of the camera 16 and the rear housing 24 may be adjusted relative to the lens holder 22 and lens assembly 20 to align/focus the lens relative to the imager 18*a*, whereby the rear housing 24 may be secured relative to the lens holder 22 via a weld washer 30 disposed at the rear housing—lens holder interface. For example, and such as shown in FIGS. 2-15, a camera assembly 16 may include the lens barrel 20, the lens holder or front housing 22, the rear housing 24, and the weld washer 30. The imager 18*a* is disposed at an imager PCB 18 that is fixedly attached (such as via adhesive or screws or other fasteners) to the rear housing 24 (FIG. 12) (such as to a surface of a rear wall of the rear housing or to a structure fixedly disposed in or formed as part of the rear housing) and the imager 18*a* is focused and aligned with the lens of the lens barrel and lens holder subassembly (FIGS. 8 and 9) via adjustment of the rear housing 24 (and imager PCB 18) relative to the front housing 22 and lens, with the front and rear housings fixed to one another after alignment via laser welding of the weld washer 30 (FIGS. 10 and 11) to the front and rear housings. This process actively aligns the imager 18*a* of the PCB 18 to the lens, which allows for control of image rotation during active alignment. This process also makes the active alignment laser welding process the final sealing process needed in manufacturing the camera assembly. Otherwise, a typical manufacturing process may require a screw, cover, and gasket station or a separate rear cover laser weld station after alignment.

The front housing 22 includes a rear or washer-interface surface 22*a* (FIG. 5) configured to receive and be laser welded to the weld washer 30 and the front housing 22 also includes an aperture 22*b* (FIG. 8) through which the lens barrel 20 is received. Together, the lens barrel 20 and front housing 22 comprise the lens holder subassembly. The rear surface 22*a* of the front housing may include a raised portion or ridge 22*c* (FIG. 9) corresponding to a shape of an inner side surface 24*a* of the rear housing 24 to help guide alignment of the rear housing and imager 18*a* at the front housing. In the other words, a shape of the raised portion 22*c* of the lens holder 22 corresponds to a shape of the rear housing 24 so that the rear housing 24 can more easily locate to the lens holder 22. When the rear housing 24 is interfaced with the lens holder 22, there may be at least some space between the rear housing 24 and the raised portion 22*c* of the lens holder 22 to accommodate adjustment of the rear housing during focus and alignment of the lens and imager. Adjustment of the rear housing 24 and imager 18*a* is relative to a lens principal point or pivot point (the point where the lens axis intersects the principal plane of the lens and the point about which the lens or imager is rotated relative to the other during active focus and alignment). The imager 18*a* is disposed at the PCB 18 which is attached at an interior surface of the rear housing (such as a back wall or rear surface of the rear housing) and may be electrically connected to a connector that is configured for electrical connection to a vehicle wire harness when the camera is installed at a vehicle. For example, at the rear side of the PCB, a flexible connector or connector header (or optionally a second PCB or connector PCB) may be electrically connected to the imager PCB and an output connector (such as a coaxial connector) at a connector portion 24*c* of the housing (FIG. 13), such as an extruded or protruding portion at a rear surface of the rear housing, for electrically connecting to a vehicle wire harness or coaxial cable when the camera is installed at the vehicle and for outputting image data signals to a system of the vehicle.

The weld washer 30, during assembly of the camera 16, slides along the outer surface of the rear housing 24 and engages the rear surface 22*a* of the front housing 22 while circumscribing the rear housing 24. The weld washer 30 includes a flat surface 30*a* for interfacing with the rear surface 22*a* of the front housing 22. The shape of the inner surface 30*b* of the weld washer corresponds to a shape of an outer side surface 24*b* of the rear housing 24 to provide an additional alignment feature between the front housing, rear housing and weld washer. The rear housing 24 and weld washer 30 may comprise any suitable shape or outline, such as a square or rectangular-shaped body. As discussed below, the rear housing may also comprise a round or circular or cylindrical shape.

During alignment, the lens barrel 20 (and therefore the lens) and lens retainer or front housing 22 remain stationary. The lens barrel may be fixedly attached to the front housing, such as via a threaded interface and/or adhesive. The rear housing 24 is moved into engagement with the front housing and adjusted by grippers (FIGS. 13 and 14) and the weld washer 30, after being disposed at the interface between the front and rear housings, "floats" across the rear surface 22*a* of the front housing 22. In other words, the lens holder subassembly is held stationary and the rear housing is moved relative to the lens holder 22 and relative to a pivot point or principal point of the lens to optically align the imager 18*a* and the lens, while the weld washer 30 is disposed at the rear surface 22*a* of the front housing 22 and around the outer surface of the rear housing 24.

Movement of the rear housing 24 results in movement of the weld washer 30 so that, when the rear housing 24 is positioned such that the imager 18*a* is in alignment with the lens, the weld washer 30 is positioned to be laser welded to the front and rear housings. The interface of the weld washer 30 at the rear surface 22*a* of the front housing 22 allows for x, y, and theta-z adjustment of the imager relative to the pivot point while the weld washer remains flat against the rear surface 22*a* of the front housing 22. In other words, the rear housing 24 can be moved along the rear surface 22*a* of the lens holder 22 (x and y axis adjustment), and rotated about a longitudinal axis of the lens barrel 20 (theta-z adjustment). The interface of the weld washer 30 at the side surface 24*b* of the rear housing 24 allows for theta-x, theta-y, and z adjustment of the imager relative to the pivot point, while still maintaining a fillable weld gap between the weld washer and the front and rear housings. In other words, the rear housing 24 can be tilted relative to the lens holder 22 (theta-x and theta-y adjustment) or moved along the longitudinal axis of the lens barrel 20 (z axis adjustment) such that a space or gap may be formed between the rear housing 24 and the rear surface 22*a* of the lens holder 22 that is accommodated by the weld washer 30.

Once the imager 18*a* is aligned with the lens of the lens barrel 20 via movement of the rear housing 24, the weld washer 30 is laser welded in place (such as to the rear surface 22*a* of the front housing and the side surface 24*b* of the rear housing) to maintain the positioning of the front and rear housings. The weld washer 30 may be welded to both the front and rear housings during the same process and/or at the same time. Laser welding may fill a gap (such as about 0.2 mm) between the weld washer 30 and the front and/or rear housings. Such a gap allows for sufficient adjustment of the imager 18*a* relative to the pivot point while maintaining a suitable spatial relationship between the front and rear housings and the weld washer for laser welding the components together.

Figure 16:
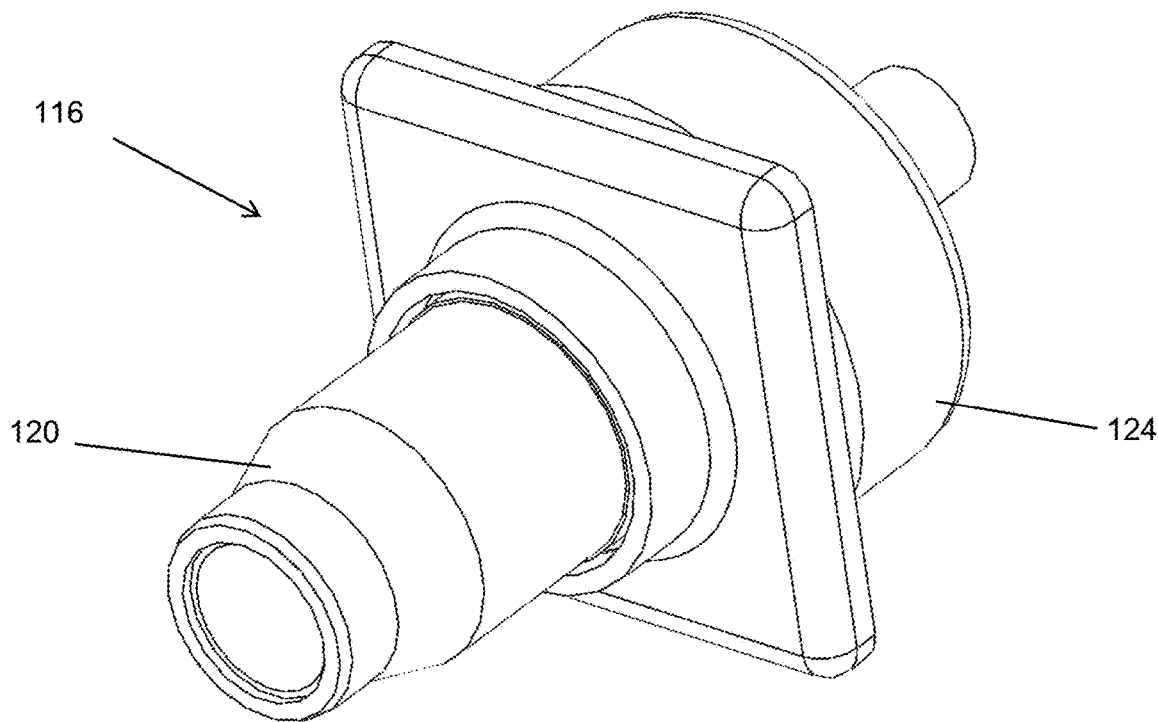
FIG. 16 is a perspective view of a camera assembly with a square face lens holder, a cylindrical rear housing, and a weld washer.
Figure 17:
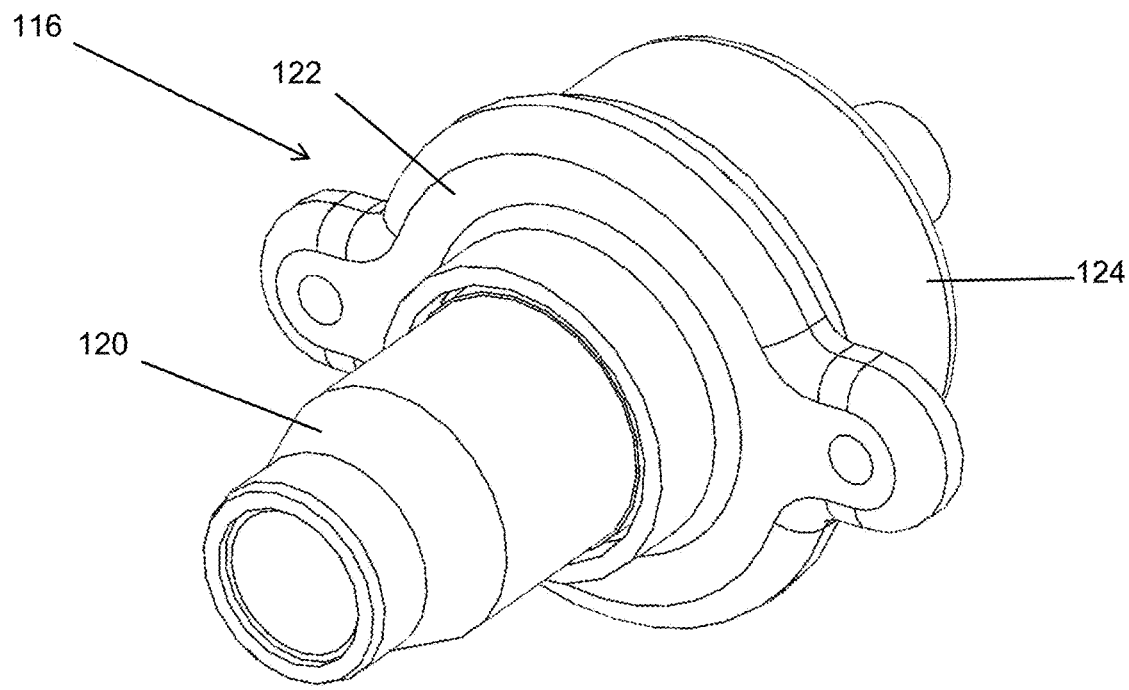
FIG. 17 is a perspective view of a camera assembly with a winged lens holder, a cylindrical rear housing, and a weld washer.
Figure 18:
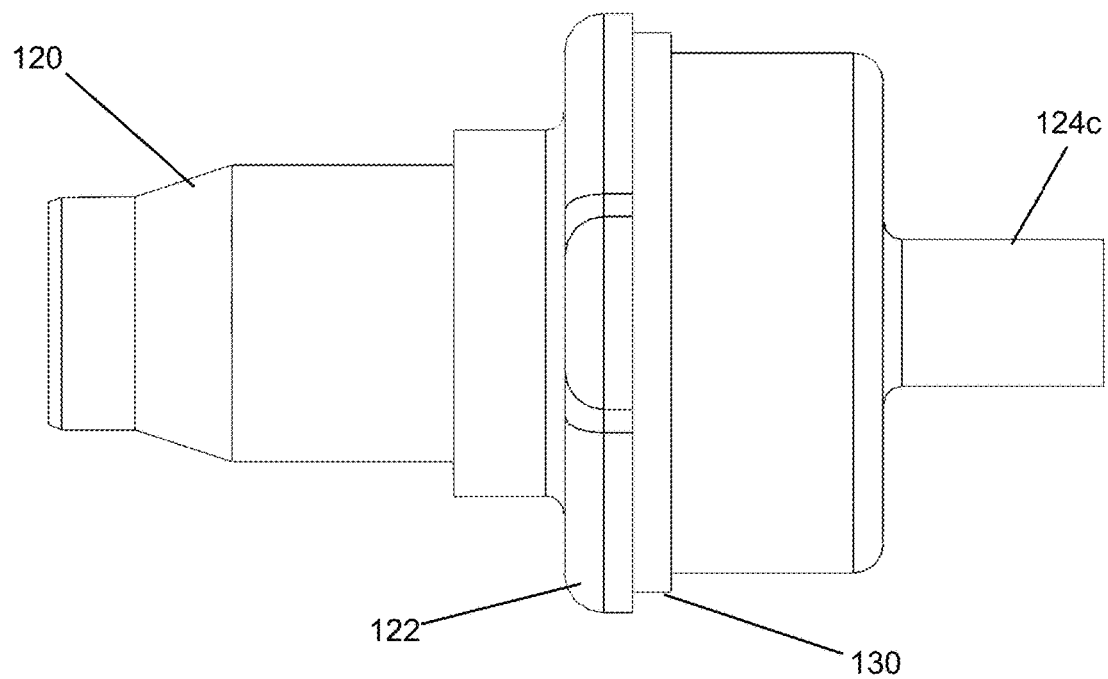
FIG. 18 is a side view of the camera assembly of FIG. 17.
Figure 19:
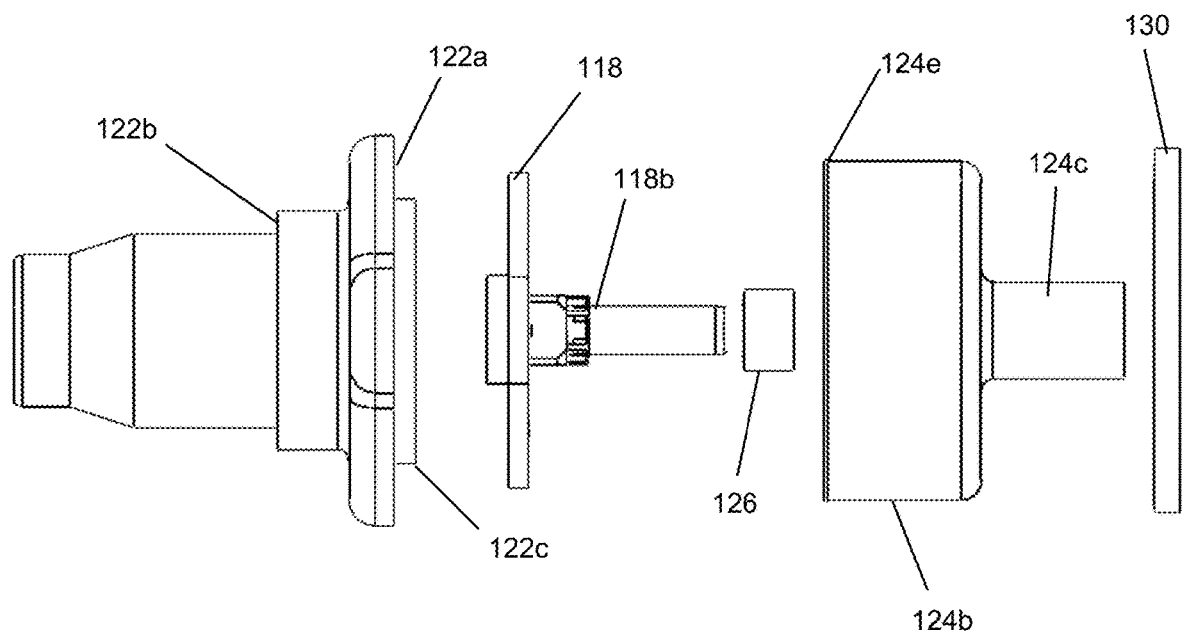
FIGS. 19-21 are exploded views of the camera assembly of FIG. 18.
Figure 20:
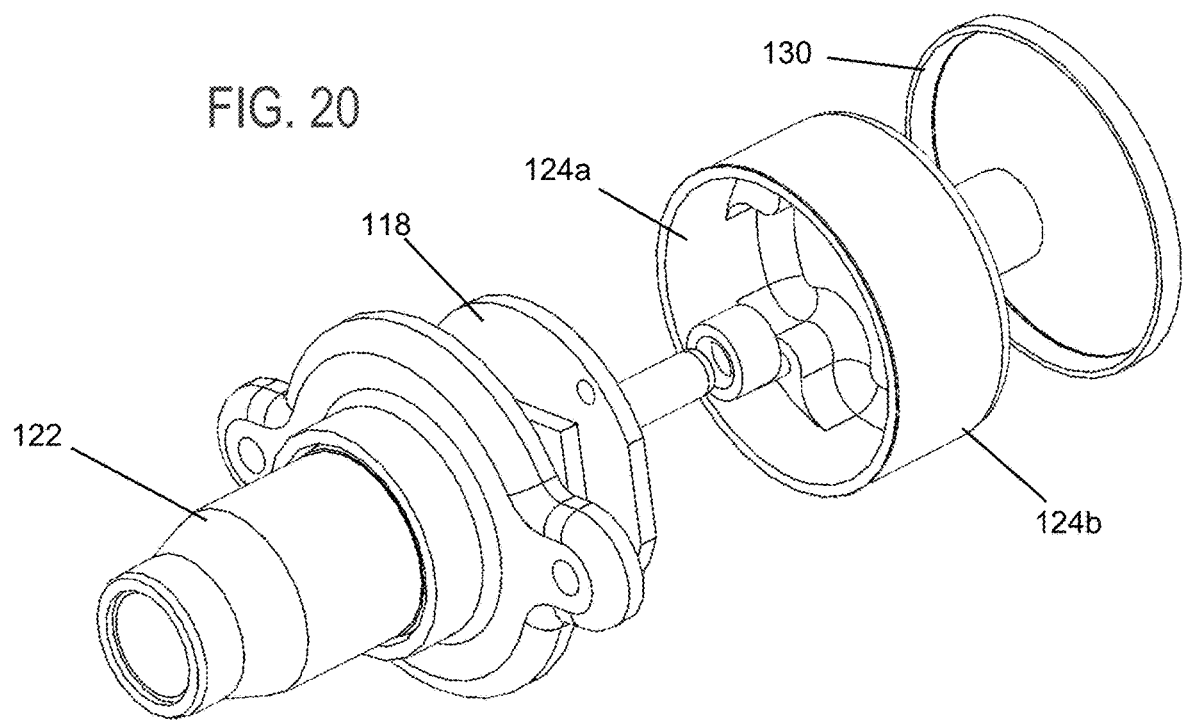
Figure 21:
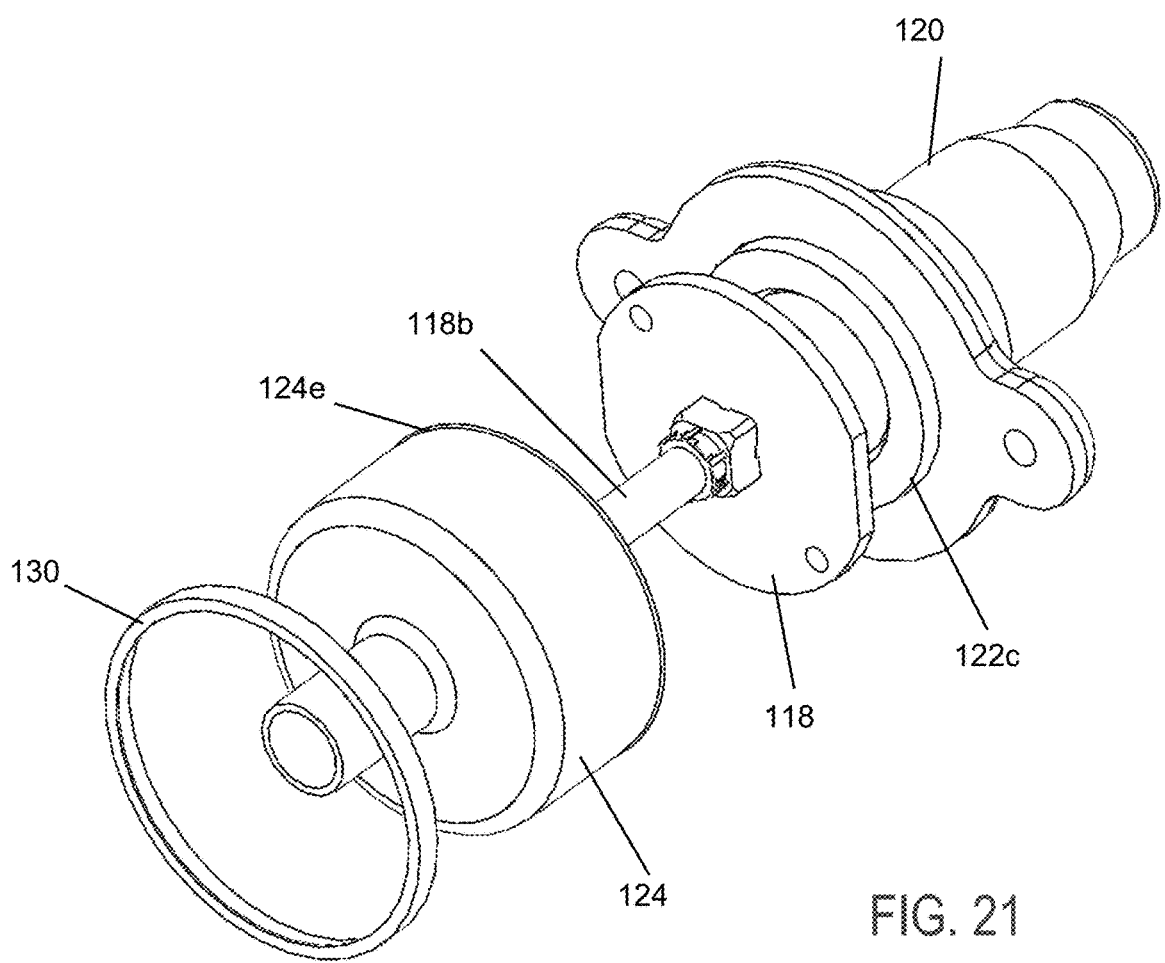
Figure 22:
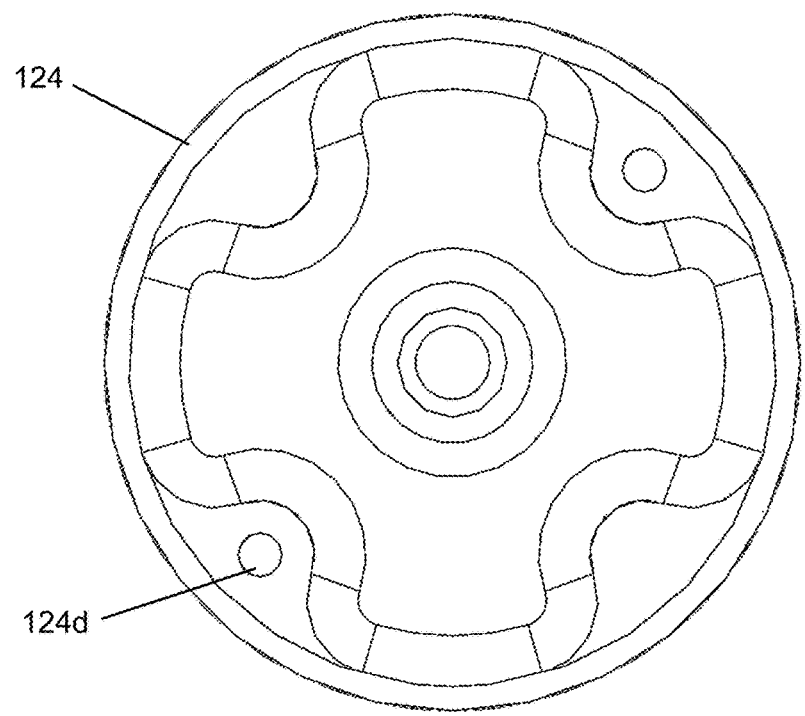
FIG. 22 is a plan view of the cylindrical rear housing of the camera assembly, shown without an imager PCB.
Figure 23:
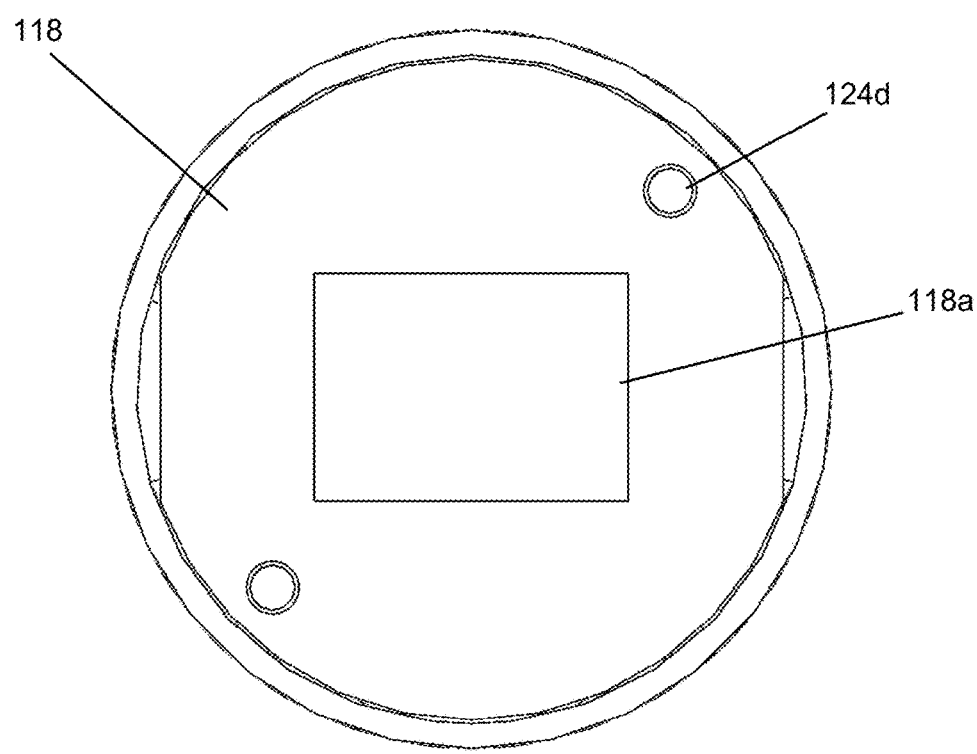
FIG. 23 is a plan view of the cylindrical rear housing and imager PCB of the camera assembly.

Optionally, and such as shown in FIGS. 16 and 17, a rear housing 124 of a camera assembly 116 may comprise a round or circular or cylindrical rear housing. A cylindrical rear housing 124 receives a corresponding round or circular or cylindrical weld washer 130 to join the rear housing 124 with a lens holder 122. The cylindrical rear housing 124 may be joined with any suitable configuration of lens holder, such as a square or rectangular-faced lens holder (FIG. 16) or a circular-faced lens holder or a winged lens holder with mounting wings or tabs or flanges (FIG. 17). A cylindrical rear housing 124 allows for improved tolerances and clearances between the corresponding weld washer 130, rear housing 124, and lens holder 122. As discussed below, the cylindrical rear housing 124 and corresponding cylindrical weld washer 130 also improves the accuracy and speed of the final sealing weld because the welding lasers are more likely to stay in focus during part rotation.

The camera assembly 116 utilizes characteristics of the camera assembly 16 described above. Referring to FIGS. 18-24, the front housing or lens holder 122 of the camera assembly 116 receives a lens barrel 120 through an aperture 122*b* of the lens holder to form a lens holder subassembly. The rear housing 124 receives a PCB 118 having an imager 118*a* disposed thereat and a connector 118*b* (such as a one piece or coaxial connector) extends from a rear surface of the PCB through an extruded portion 124*c* of the rear housing for electrical connection with a vehicle wiring harness when installed at the vehicle. The rear housing 124 engages the lens holder 122 at a rear surface 122*a* of the lens holder, with a ridge or raised portion 122*c* of the rear surface corresponding to the shape or inner side surface 124*a* of the rear housing 124 to help guide alignment of the rear housing 124 at the lens holder 122. The weld washer 130 engages the rear surface 122*a* of the lens holder 122 and an outer side surface 124*b* of the rear housing 124 and, after the rear housing 124 is adjusted to focus and align the lens and imager 118*a*, the weld washer 130 is laser welded thereat to retain the lens holder 122 and rear housing 124 together with the lens and imager focused and aligned.

The cylindrical rear housing 124 receives the PCB 118 at the rear surface of the rear housing, with the PCB 118 having the imager 118*a* facing the lens barrel 120 and the connector 118*b* protruding within the connector portion 124*c* of the rear housing. Alignment elements 124*d*, such as alignment pins (or optionally screws or other fasteners), may protrude from the rear surface of the rear housing and through the PCB to align and retain the PCB 118 at the rear housing. The alignment elements 124*d* may be integrally formed with the rear surface of the rear housing 124. Optionally, the PCB 118 is rounded or circular in shape to correspond to the interior shape of the rear housing 124. The connector portion 124*c* may threadedly engage the connector 118*b* to further retain and align the PCB 118 with the rear housing 124. For example, a gasket 126 that receives or threadedly receives the connector 118*b* may be disposed at the impact extruded connector portion 124*c* of the rear housing 124.

Figure 24:
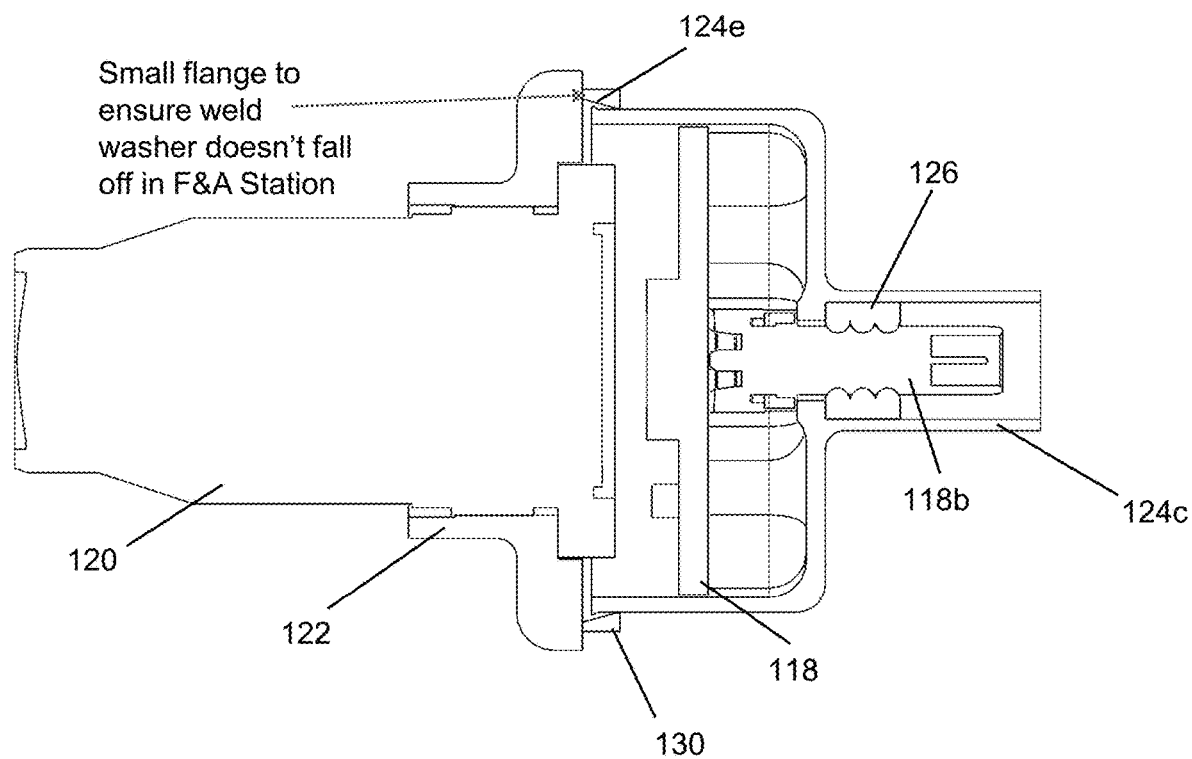
FIG. 24 is a sectional view of the camera assembly with the weld washer disposed at the rear housing—lens holder interface.

Optionally, and as shown in FIG. 24, a lip or flange 124*e* may protrude from the outer side surface 124*b* and circumscribe the outer edge of the rear housing 124 so that when the weld washer 130 is disposed at the rear housing and engages the flange 124*e*, the weld washer 130 is precluded from falling off from around the rear housing 124, such as during machine manipulation when the rear housing 124 is adjusted to focus and align the imager 118*a* and lens. In other words, when the weld washer 130 is placed around the rear housing 124 and moved along the rear housing in a direction toward the lens holder 122 (see, for example, FIGS. 20 and 21), the weld washer is precluded from moving past the flange 124*e* in that direction. For example, if while adjusting the rear housing 124 relative to the lens holder 122, the rear housing is lifted off the rear surface of the lens holder so that a large enough gap is created between the rear housing and the rear surface of the lens holder, the weld washer 130 will lift with the rear housing rather than fall off the rear housing onto the lens holder.

Figure 25:
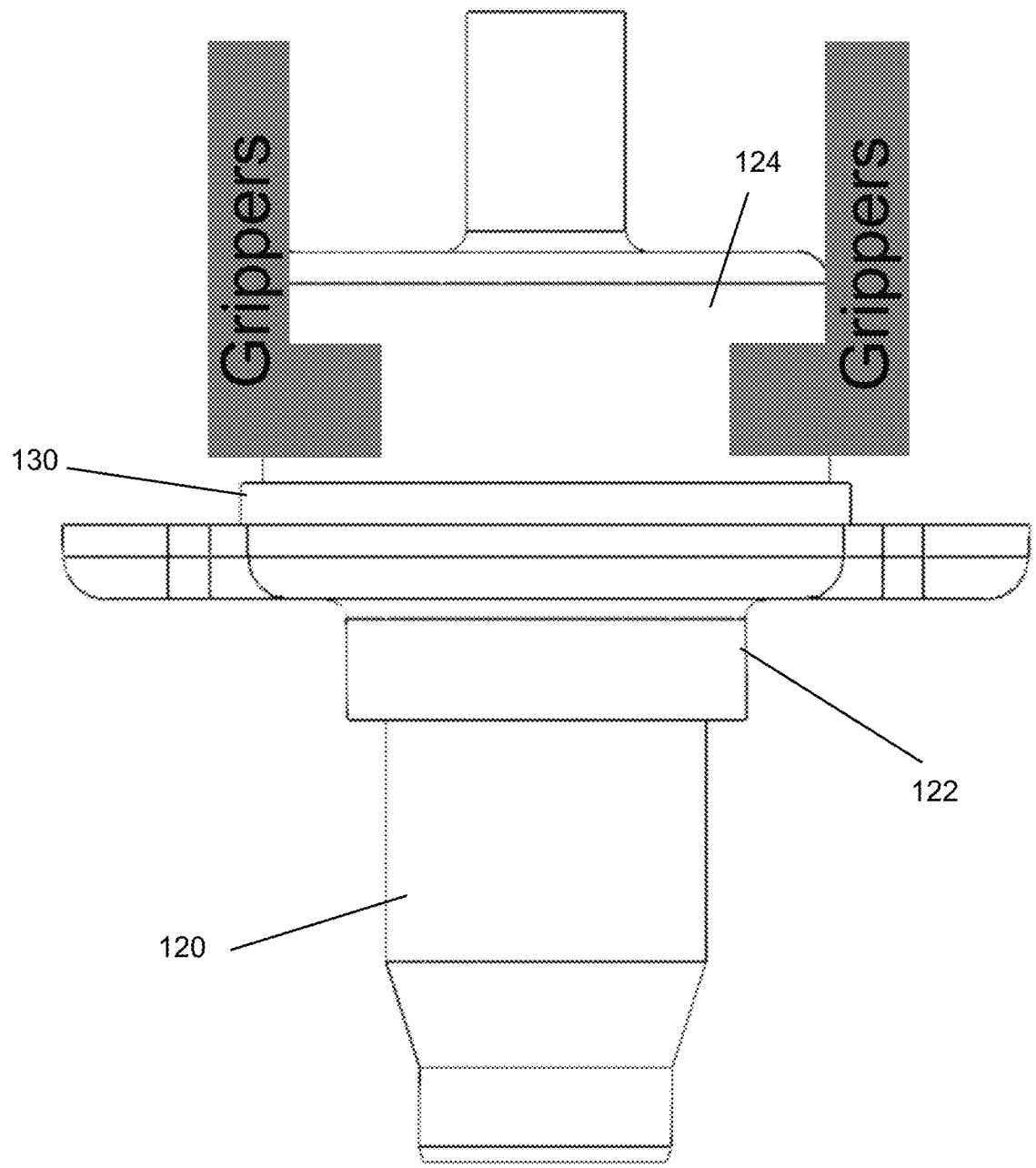
FIG. 25 is a side view of the camera assembly, with the rear housing grasped and adjusted by the grippers to optically align the imager disposed at the rear housing with the lens.
Figure 26:
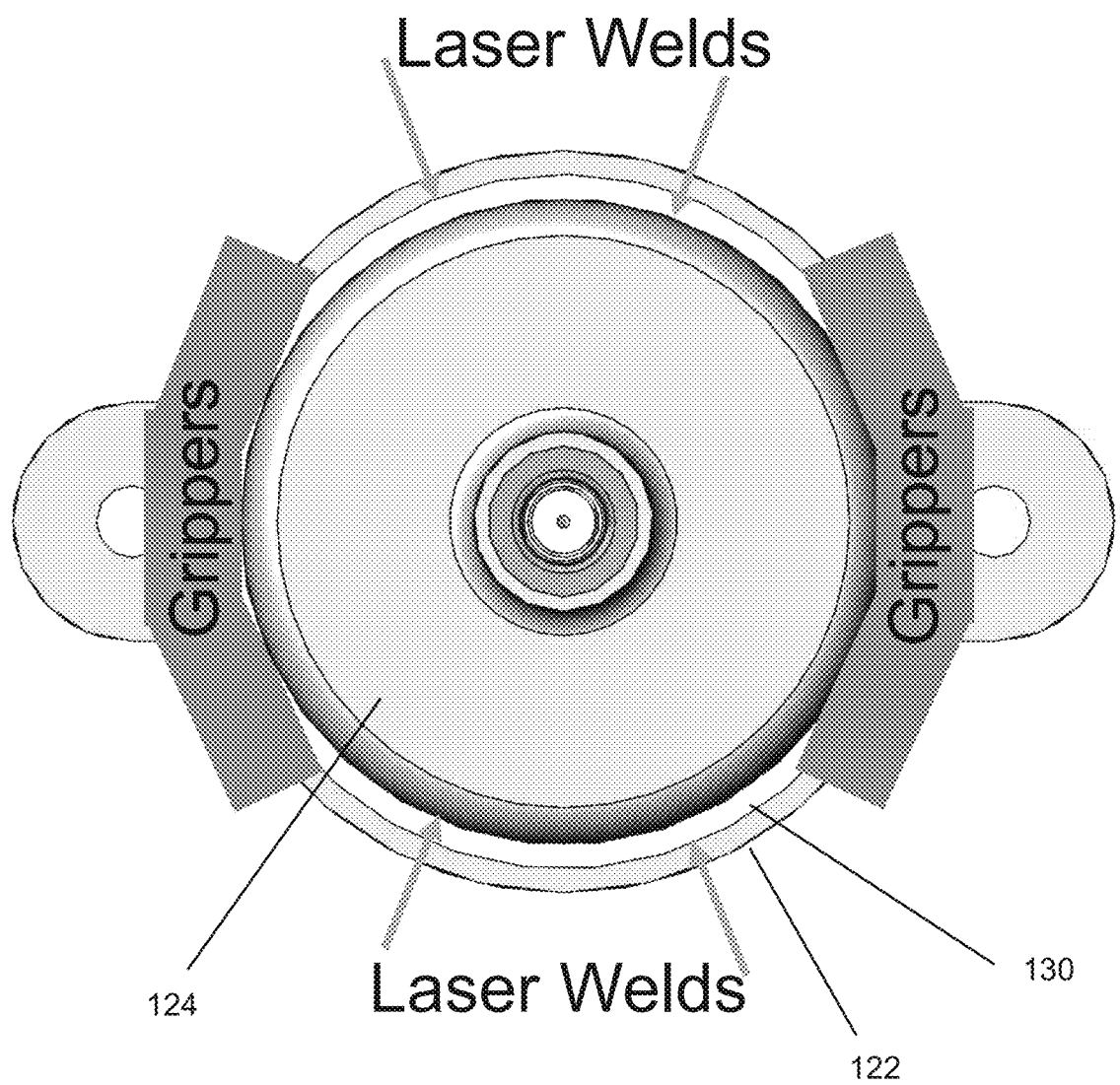
FIG. 26 is a top view of the camera assembly, with the imager optically aligned with the lens and the weld washer laser welded to the rear housing and lens holder to secure the rear housing and lens holder together.

As shown in FIG. 25, the rear housing 124 is adjusted relative to the lens holder 122 along six axes via grippers to focus and align the imager 118*a* and the lens. Once the imager and lens are focused and aligned, the weld washer 130 may be tack welded to the rear housing 124 and lens holder 122, such as at one or two or three or four or more positions along the weld washer 130 to form a temporary or preliminary connection between the weld washer 130 and the lens holder 122 and between the weld washer 130 and the rear housing 124. For example, in the illustrated embodiment of FIG. 26, the weld washer 130 is tack welded to the rear housing 124 at two discrete locations 180 degrees apart from each other around the circular weld washer 130 and the weld washer 130 is tack welded to the lens holder at two different discrete locations 180 degrees apart from each other around the weld washer. However, it should be understood that the weld washer may be tack welded to the lens holder and rear housing at any suitable number or variety of positions around the weld washer. Tack welding before full welding may result in cycle time reduction.

Figure 27:
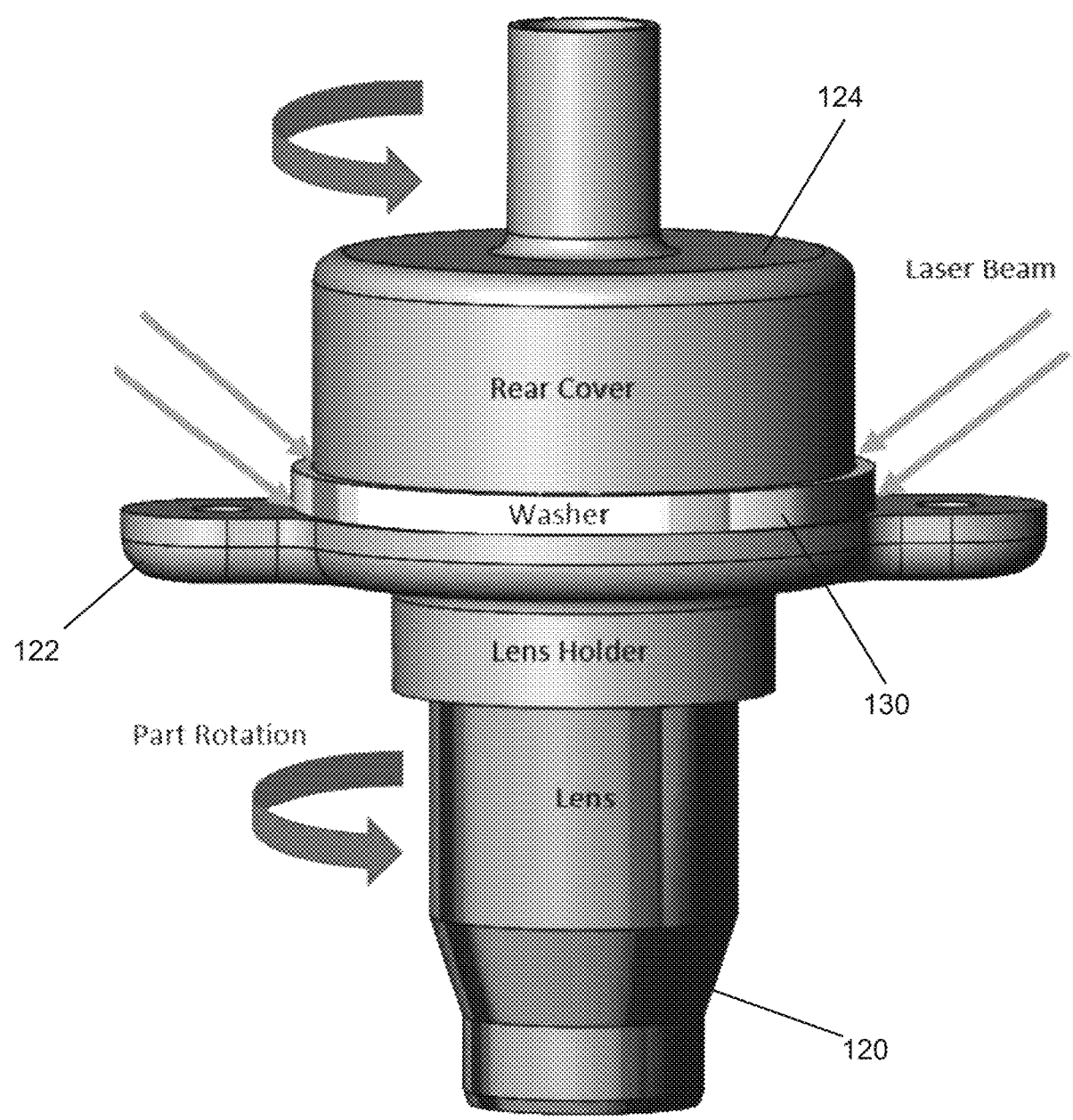
FIG. 27 is a perspective view of the camera assembly, showing the camera assembly rotated and the weld washer further laser welded to the rear housing and lens holder to seal the rear housing and lens holder.

After tack welding, FIG. 27 shows that the weld washer 130 may be further laser welded to the lens holder 122 and rear housing 124 in a final welding step to increase the strength of the connection between and seal the weld washer 130 and lens holder 122 and rear housing 124. For example, the camera assembly 116 may be rotated about a longitudinal axis as stationary lasers weld the weld washer 130 to the rear housing 124 and lens holder 122. In other words, the lasers remain stationary while the camera assembly is rotated or pivoted or otherwise manipulated so that the laser moves along the welding seam. The round or cylindrical rear housing and weld washer improves accuracy and speed of the final welding step because the lasers are more likely to stay in focus if they remain stationary while the part is rotated. As shown in the illustrated embodiment, the stationary lasers weld along the upper and lower edges of the weld washer to secure the washer to both the lens holder 122 and the rear housing 124. Because the rear housing 124 and weld washer 130 are cylindrical, the distance between the lasers and the weld should be constant as the part is rotated about its longitudinal axis, ensuring a consistent and accurate weld.

Thus, the vehicular camera may include (i) a lens barrel accommodating a lens and having an inner end, with the lens barrel having a cylindrical portion, (ii) a lens holder for receiving the inner end of the lens barrel, the lens barrel fixedly attached to the lens holder, (iii) an imager printed circuit board, with an imager disposed at a first side of the imager printed circuit board, (iv) a rear housing configured to engage the lens holder, and (v) a weld washer. The imager printed circuit board is fixedly attached at the rear housing so that, with the rear housing engaging the lens holder, the first side of the imager printed circuit board faces the lens of the lens barrel. With the rear housing engaging the lens holder, the weld washer circumscribes the rear housing and at the rear housing—lens holder interface. With the rear housing positioned at the lens holder, the rear housing is movable relative to the lens holder to optically align and focus the lens at the imager. After the lens is optically aligned and focused relative to the imager, the weld washer is welded to the rear housing and is welded to the lens holder to secure the lens barrel relative to the imager printed circuit board.

Figure 28:
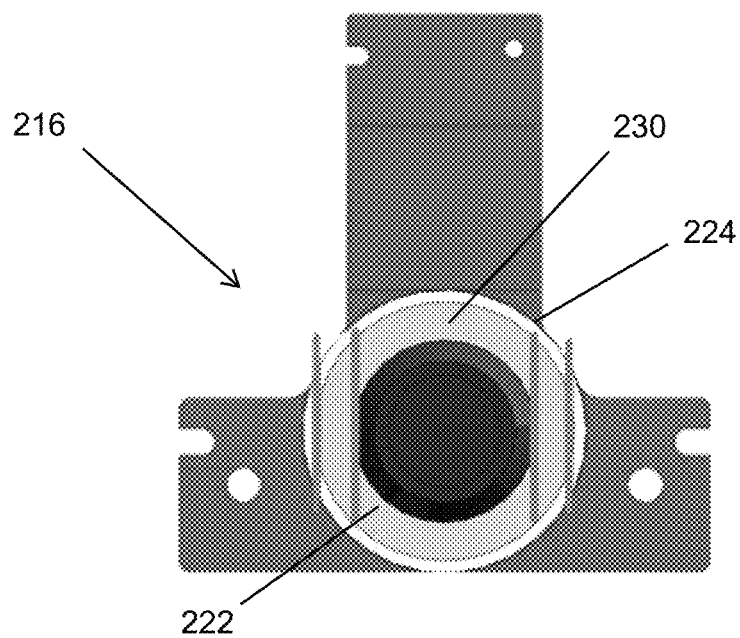
FIG. 28 is a plan view of a camera assembly with a weld washer fixed to a rear housing and a front housing of the camera assembly via linear laser welds.

As shown in FIG. 28, when assembling a camera assembly 216, laser welding the circular interfaces between a rear housing 224, a weld washer 230, and a front housing or lens holder 222 without rotating the part during laser welding (rather than transcribing the circular interface as described above) may result in linear welds that are tangential to the circular interfaces. Thus, after focusing and optically aligning the lens and imager, a relatively short line (such as 2 mm) may be welded at each position before the laser weld falls off the weld gap.

Figure 29:
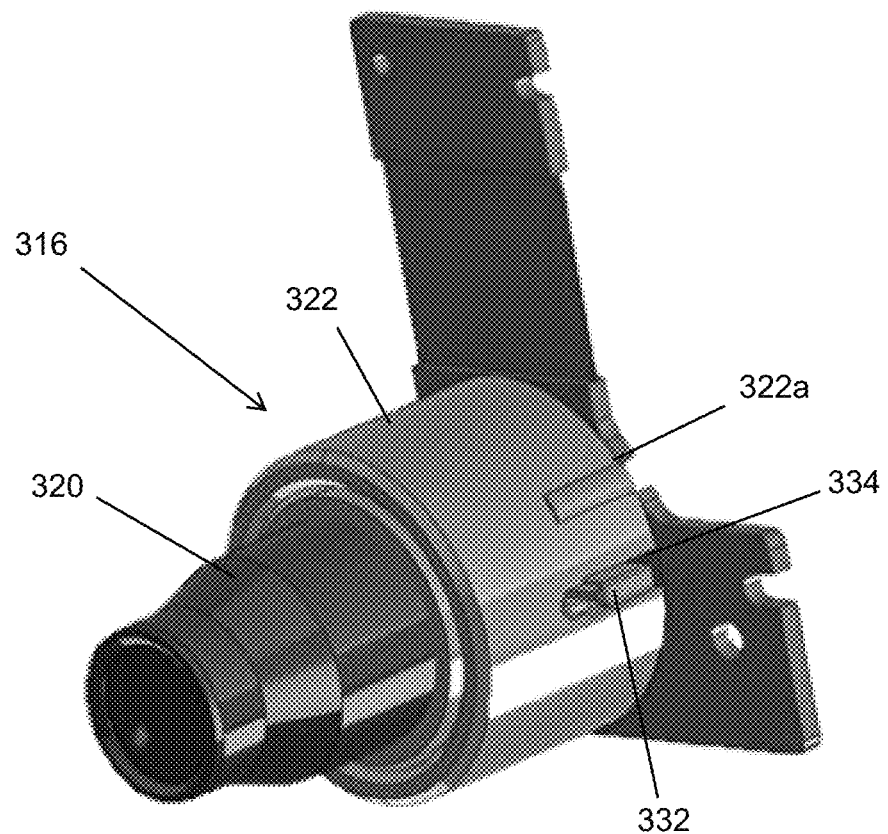
FIG. 29 is a perspective view of a camera assembly with a winged lens barrel and a front housing including slots configured to receive the wings of the winged lens barrel, the wings laser welded to the front housing.

Optionally, and such as shown in FIG. 29, a camera assembly 316 includes a winged lens barrel 320 with at least one wing 332 protruding along a side of the lens barrel 320. The lens barrel 320 is received within a lens holder or front housing 322 that includes at least one slot 334 extending from an edge 322a longitudinally along the side of the lens holder 322. The slot 334 receives the corresponding wing 332 when the lens barrel 320 is disposed in the lens holder 322. The slot 334 and wing 332 are dimensioned so that the wing 332 has at least some freedom of movement within the slot 334 and thus the lens barrel 320 has freedom of movement to focus and align the lens and imager. The lens barrel 320 is fixed relative to the lens holder 322 after the lens and imager are focused and optically aligned via laser welding the wing 332 to the respective slot 334. For example, laser welding may join a side surface of the wing 332 to one or both side surfaces of the slot 334 and optionally may at least partially fill a gap between the slot 334 and wing 332 to accommodate movement of the wing relative to the side surface of the slot during focus and alignment. Laser welding the wing 332 to the slot 334 allows for a larger (and therefore more secure) weld interface between the lens barrel 320 and the lens holder 322 than a linear weld at a circular interface such as described above with regard to FIG. 28. For example, a 4 mm weld, which is enough for acceptable break strength, may be achievable. After lens fixation, the camera assembly 316 may be measured in five axes (with lens rotation (i.e., theta-z about a longitudinal axis of the lens barrel) not being measurable).

Figure 30:
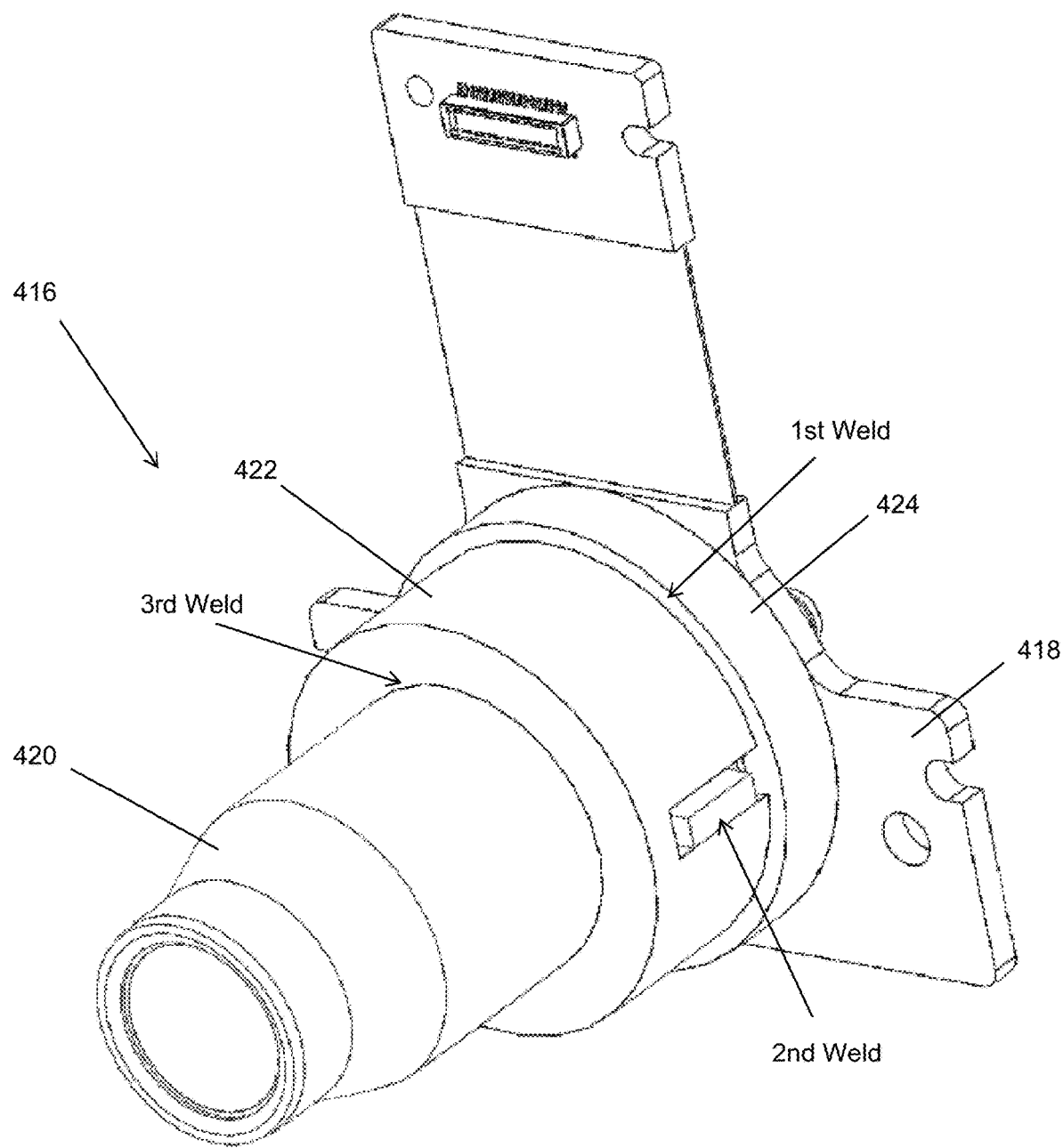
FIG. 30 is a perspective view of a camera assembly with a winged lens barrel received within a slotted front housing and having a circular interface between the front housing and the rear housing.
Figure 31:
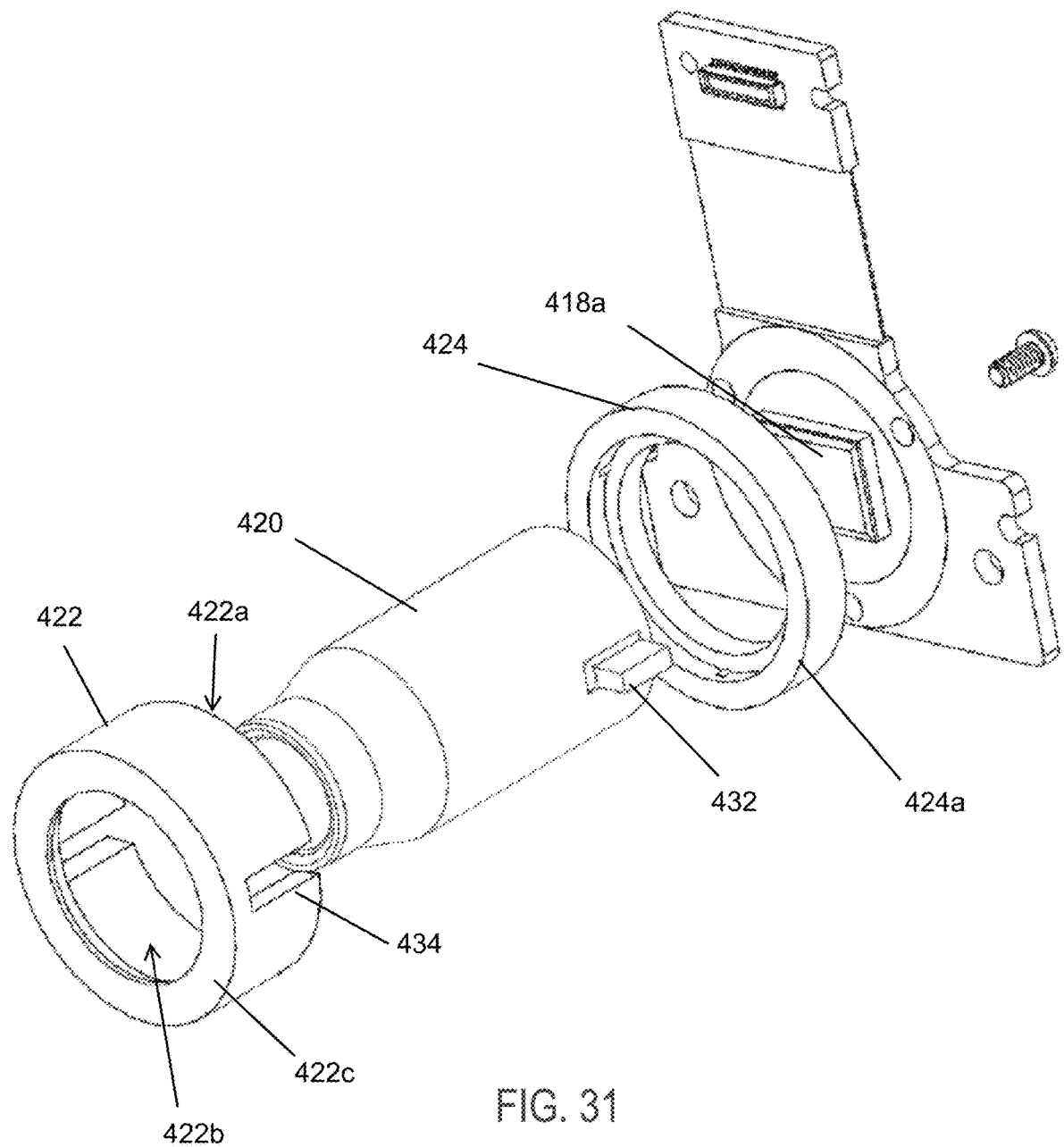
FIGS. 31 and 32 are exploded views of the camera assembly of FIG. 30.
Figure 32:
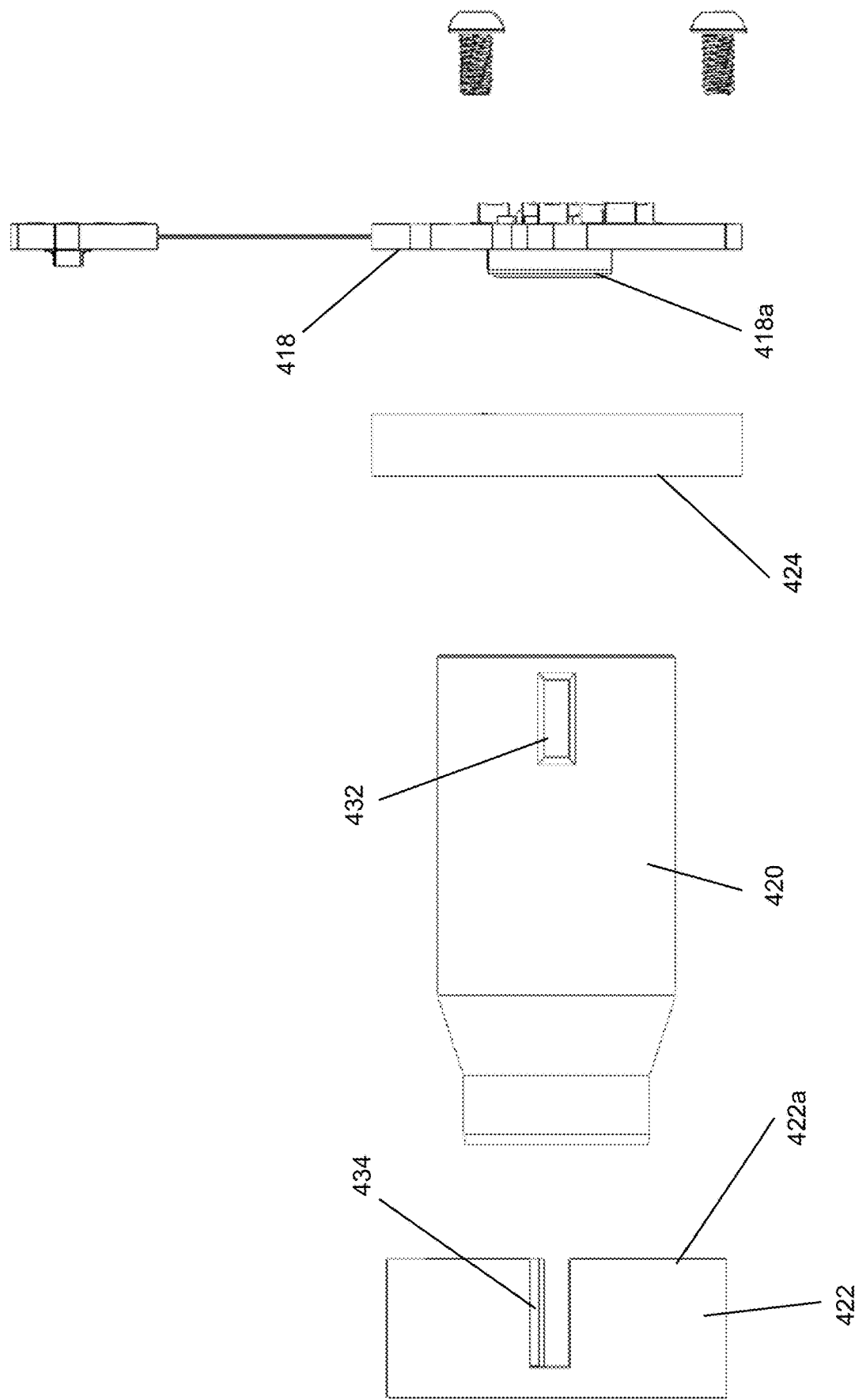
Figure 33:
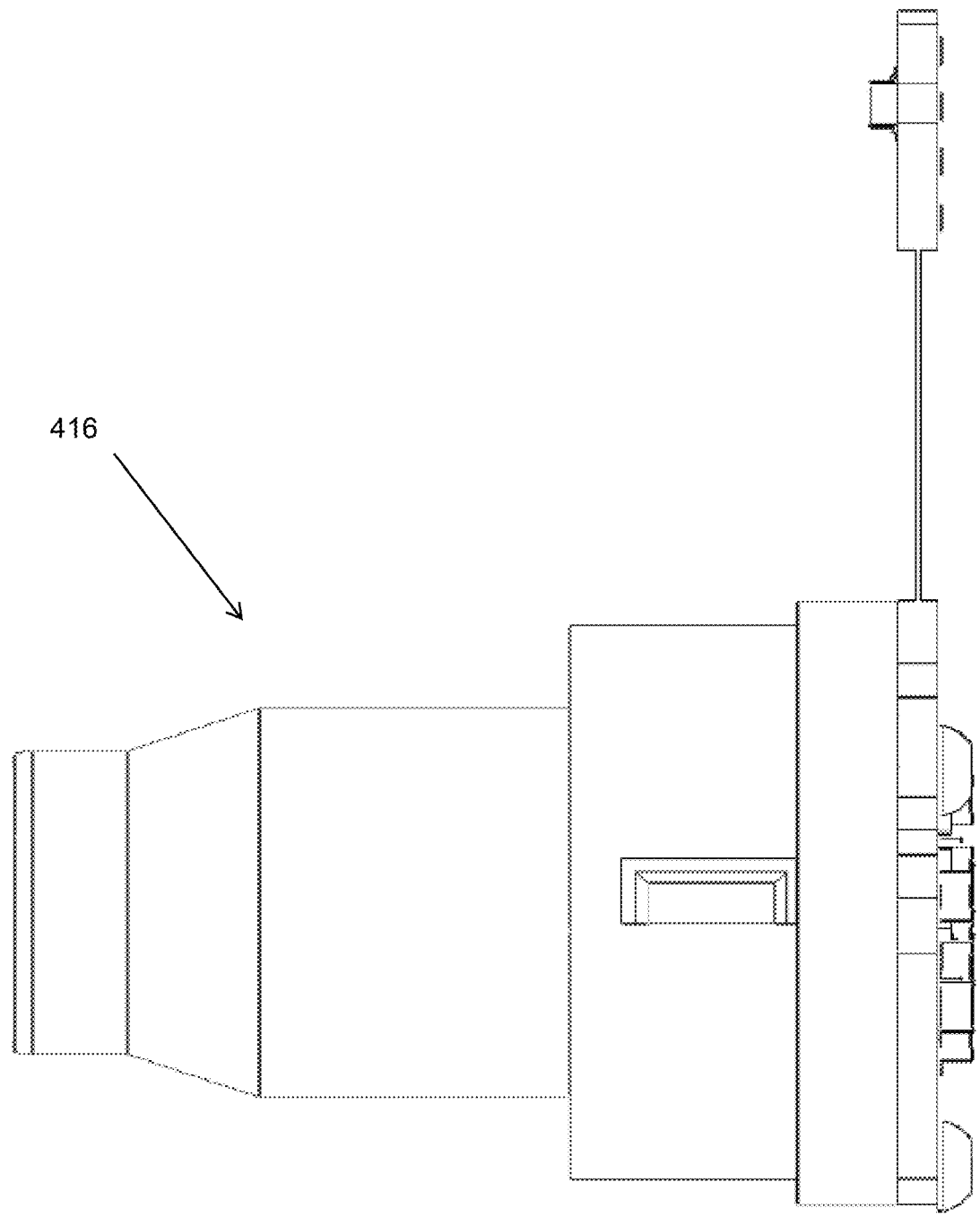
FIGS. 33 and 34 are side views of the camera assembly of FIG. 30.
Figure 34:
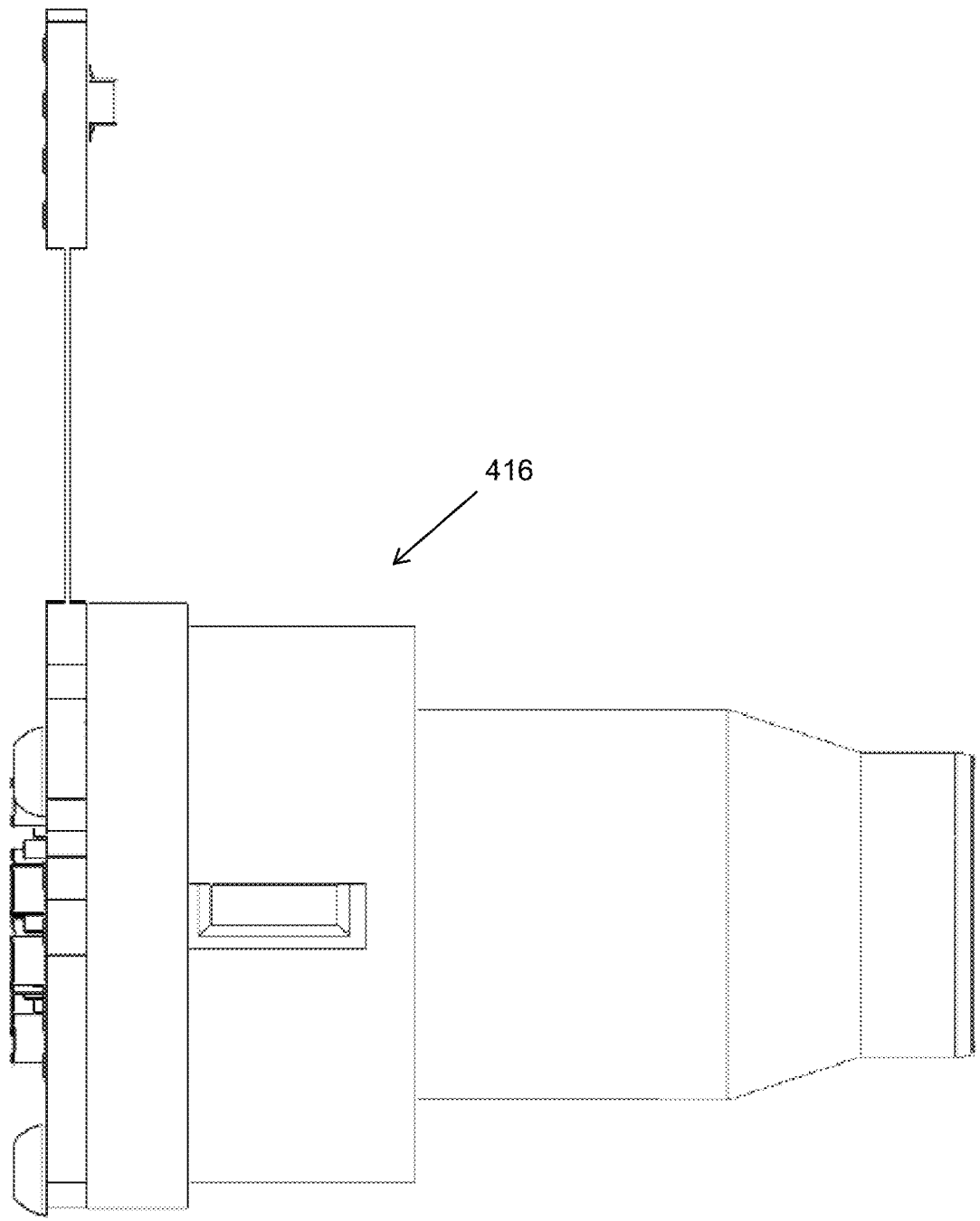
Figure 35:
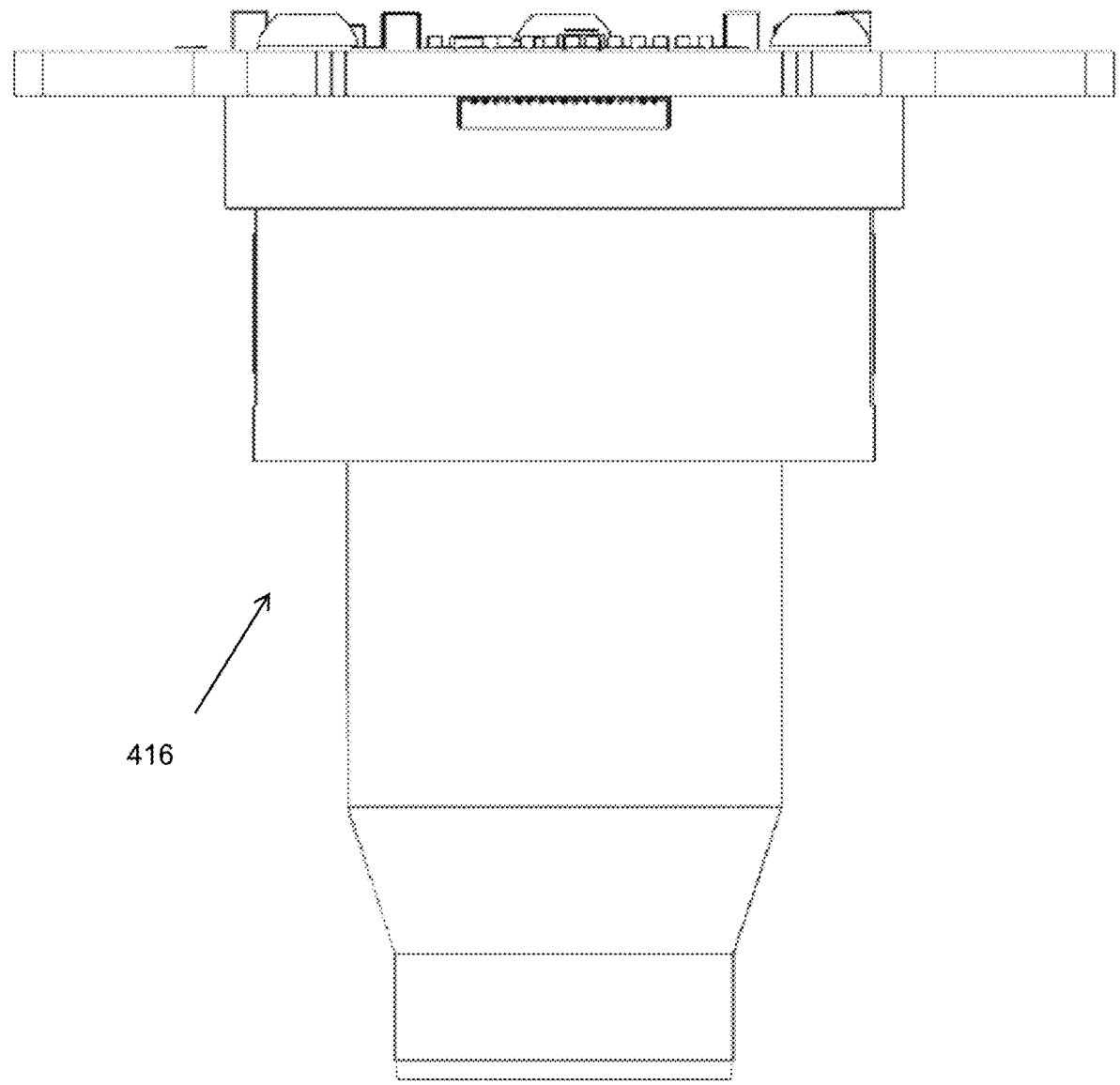
FIG. 35 is a top view of the camera assembly of FIG. 30.
Figure 36:
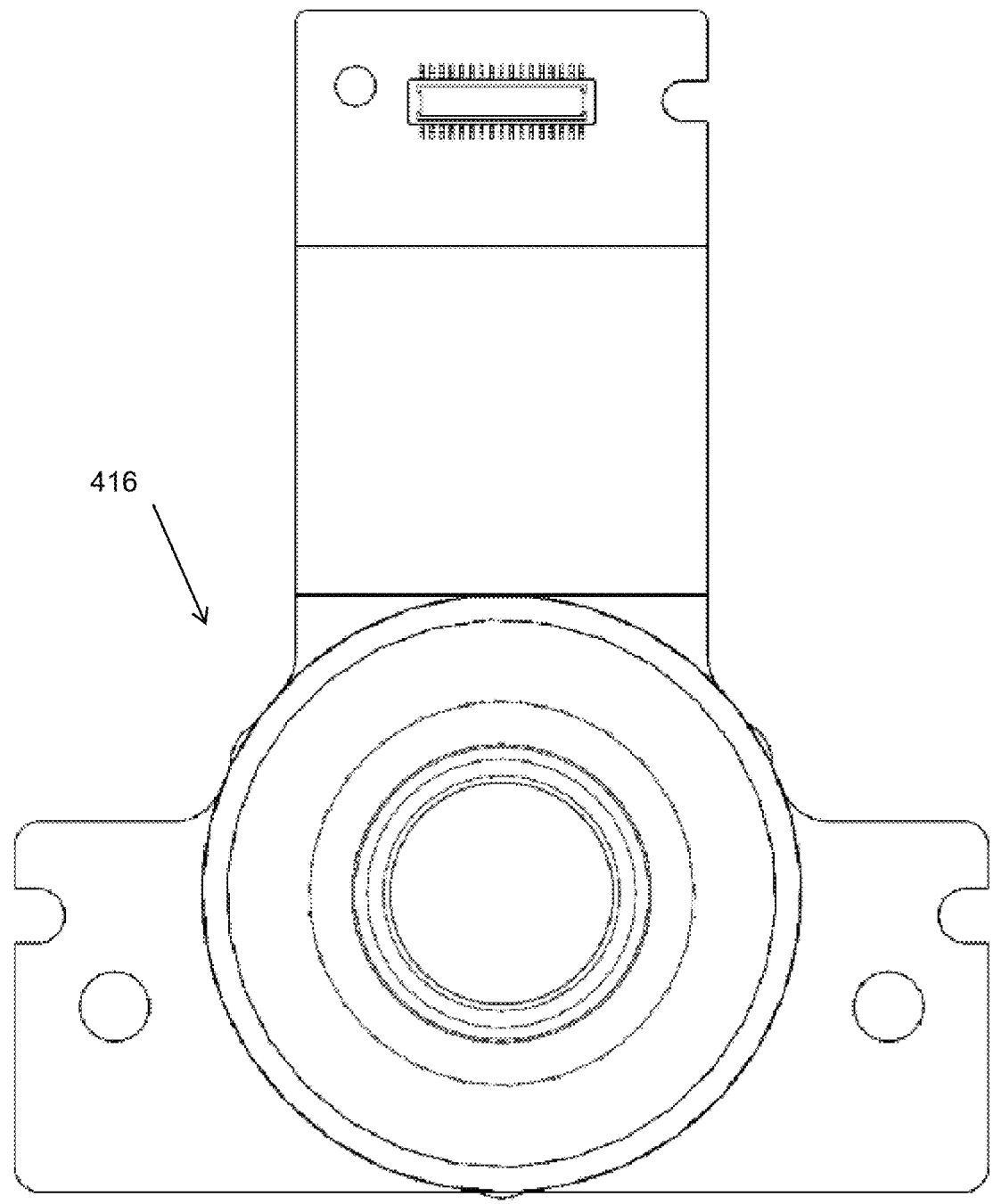
FIG. 36 is a front view of the camera assembly of FIG. 30.
Figure 37:
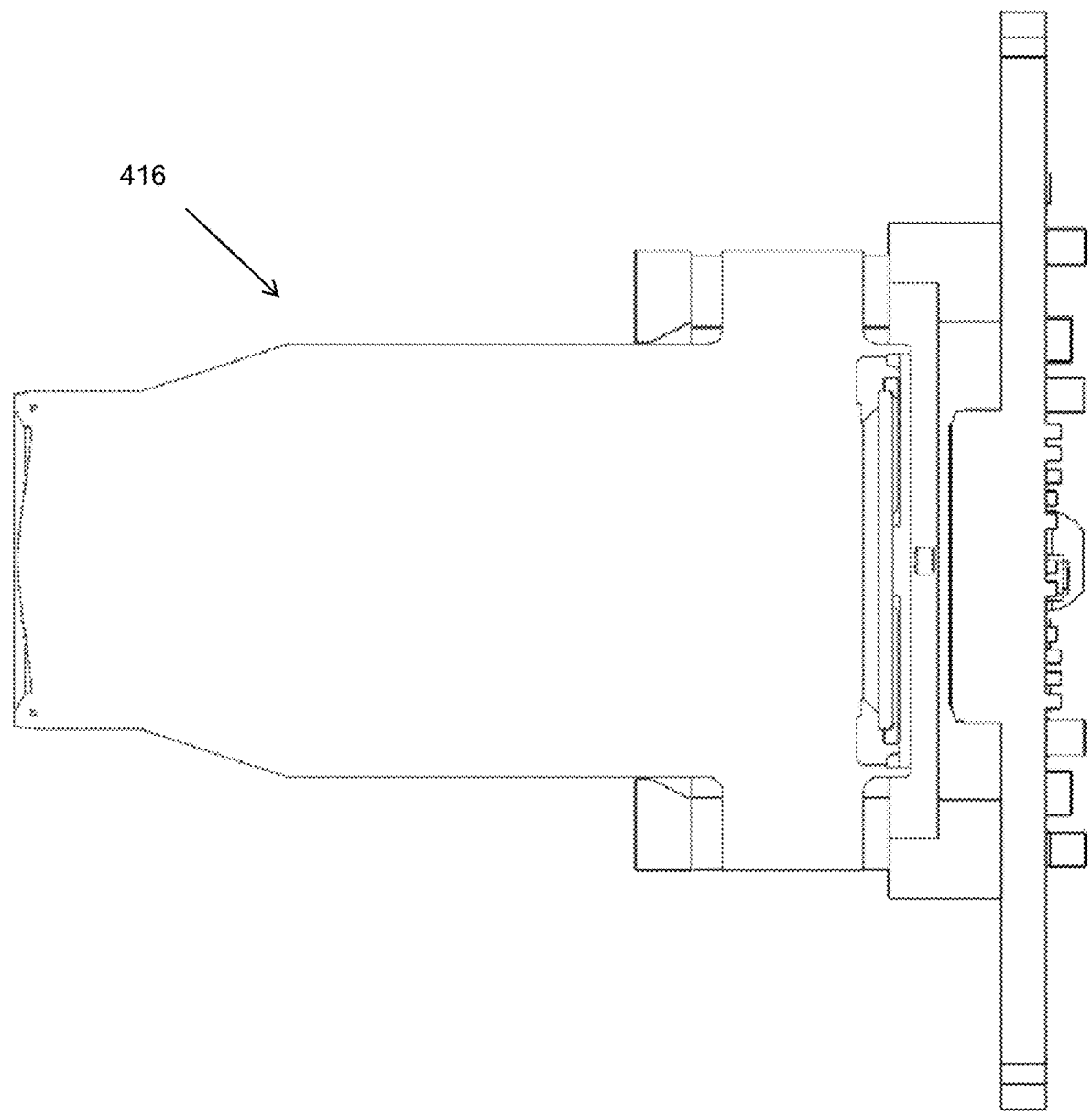
FIG. 37 is a sectional view of the camera assembly of FIG. 30.
Figure 38:
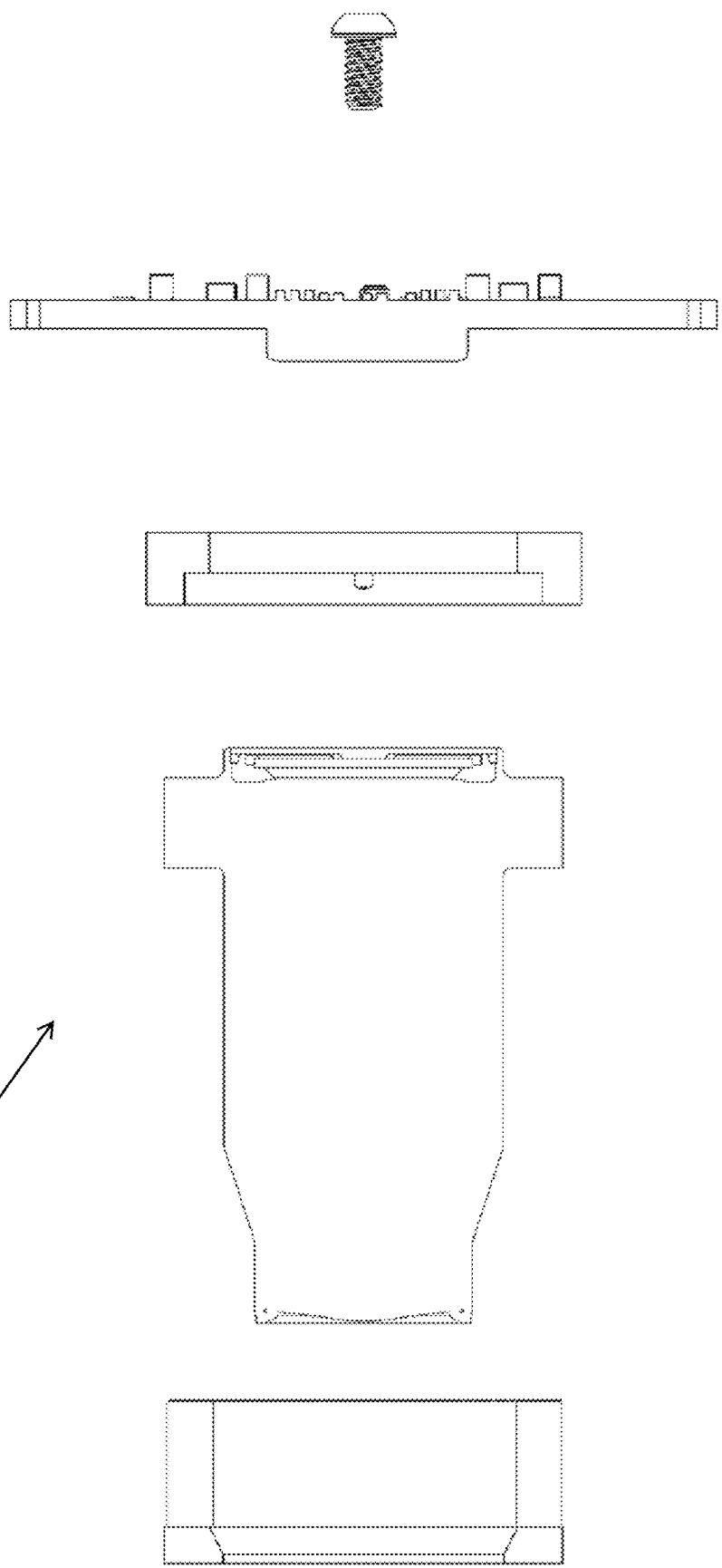
FIG. 38 is an exploded sectional view of the camera assembly of FIG. 30.

Optionally, and such as shown in FIGS. 30-38, a camera assembly 416 may provide both a circular interface for laser welding and a winged interface for laser welding to achieve increased strength in the weld and an improved ability to maintain focus and alignment between the lens and imager during the laser welding process. The camera assembly 416 includes a lens barrel 420, a lens holder or front housing 422, a rear housing 424, and a printed circuit board (PCB) 418 having an imager 418a disposed at a front surface of the PCB 418. As shown in FIG. 30, the rear housing 424 is fixedly attached at the front surface of the PCB 418, such as via adhesive or screws or other fasteners, and circumscribes the imager 418a at the PCB 418. The front housing 422 engages the rear housing 424, such as at a front receiving or engagement surface 424a of the rear housing 424. The lens barrel 420 includes at least one optic element or lens and is received within the front housing 422 and the lens barrel 420 extends through an aperture 422b of the front housing 422. Before laser welding, the front housing 422 is movable relative to the rear housing 424 and the lens barrel 420 is movable relative to the front housing 422 to focus and optically align the lens and the imager 418a (such as described above). As shown in FIG. 30, after the lens is focused and aligned with the imager 418a, application of a first laser weld fixes the front housing 422 relative to the rear housing 424 and application of a second laser weld fixes the lens barrel 420 relative to the front housing 422. Optionally, application of a third laser weld between the lens barrel 420 and front housing 422 may be made (such as at least partially around the lens barrel at the outer end of the front housing), such as if additional strength is needed. The second laser weld (and optional third laser weld) between the lens barrel 420 and the front housing 422 may be applied before the first laser weld is applied that fixes the front housing 422 to the rear housing 424, or the second (and optional third laser weld) may be applied after the first laser weld is applied. Thus, the lens barrel 420 may be fixed relative to the front housing 422 before or after the front housing 422 is fixed relative to the rear housing 424.

The lens barrel 420 comprises a winged lens barrel having one or more wings 432 extending radially from a side surface of the lens barrel 420. As shown in the illustrated embodiment, the lens barrel includes a pair of wings 432 extending along opposing sides of the lens barrel 420. The front housing 422 comprises one or more slots 434 (such as at least two, with the two slots being diametrically opposite one another) extending longitudinally along the front housing 422 from an end or edge 422a of the front housing that engages the rear housing 424. With the lens barrel 420 received within the front housing 422, the wings 432 are configured to be received within respective slots 434 of the front housing 422. The cross dimensions of the wings 432 and the slots 434 are selected to allow for movement of the wings along the slots and across the slots and to allow for twisting or tilting of the tabs within the slots, so as to allow for adjustment in multiple degrees of freedom during the focus and alignment of the lens relative to the imager. The lens barrel and lens holder may utilize characteristics of the wings and slots described in U.S. Patent Pub. No. US-2021-0382375, which is hereby incorporated herein by reference in its entirety.

Application of the first laser weld fixes the front housing 422 relative to the rear housing 424 and thus fixes the lens relative to the imager 418a along the X and Y axes (i.e., along the plane of the imager). The first laser weld is made at an interface between the edge 422a of the front housing 422 and the front surface 424a of the rear housing 424 (see FIGS. 30 and 31). The first weld may trace or transcribe the edge 422a of the front housing at the interface between the front housing and the rear housing. Optionally, the first weld may be linear and thus tangential relative to a rounded edge of the front housing. The first weld gap (i.e., degree of freedom of movement between the front housing and the rear housing prior to application of the first laser weld) allows for correction along the X and Y axes (much like the weld between the weld washer 130 and lens holder 122 described above and shown in FIG. 27).

During application of the first weld, the rear housing 424 and front housing 422 may be pulled closer to one another, even though they are already in contact. If the first weld is applied prior to the second and third welds, application of the first weld should not significantly affect the focus or plane since the front housing 422 would not yet be fixed to the lens barrel 420 due to the spaced relationship of the wings 432 and slots 434. If application of the first weld does affect the focus or alignment of the lens and imager, the lens may be corrected along four axes (all except X and Y axes) while the lens is held by the alignment machine (grippers) according to the freedom of movement between the wings 432 and slots 434.

Application of the second laser weld (see FIG. 30) fixes the lens barrel 420 relative to the front housing 422 and thus fixes the lens relative to the imager along the remaining four axes (i.e., along the longitudinal axis of the lens barrel, about the longitudinal axis of the lens barrel, and about the X and Y axes of the imager plane). Lens movement may be permitted in the theta-z direction (i.e., about the longitudinal axis of the lens barrel), which should not affect the camera's performance. The second laser weld is applied between the wings 432 of the lens barrel 420 and the respective slots 434 of the front housing 422 and optionally fills a gap between the respective wing and slot.

Application of the optional third laser weld (see FIGS. 30 and 31) further fixes the lens barrel 420 to the front housing 422 and keeps the front housing 422 centered on the lens barrel 420, therefore keeping the second weld within welding tolerance. The third weld is similar to the weld between the weld washer 130 and rear housing 124 described above and shown in FIG. 27, and is made at the interface between the outer end 422c of the front housing, opposite the end 422a that engages the rear housing 424, and an outer surface of the lens barrel 420.

Thus, the vehicular camera may include (i) a PCB having a first side and a second side opposite the first side and separated from the first side by a thickness of the PCB, where an imager is disposed at the first side of the PCB; (ii) a lens barrel accommodating a lens and having an inner end, with the lens barrel having a radial protrusion (and optionally two or more radial protrusions) protruding radially outward at or near the inner end of the lens barrel; (iii) a lens holder for receiving the inner end of the lens barrel, the lens holder having a slot (and optionally two or more slots) extending longitudinally along the lens holder from an engaging end of the lens holder; and (iv) a rear housing or element or disc that is attached at the PCB and circumscribes the imager and that engages the engaging end of the lens holder so that the first side of the PCB faces the lens, where the lens holder is adjustable relative to the rear housing and the imager to at least partially optically align and focus the imager and the lens. The radial protrusion is movable within the slot while the lens barrel is adjusted relative to the imager to at least partially optically align and focus the imager and the lens. With the lens at least partially optically aligned and focused relative to the imager, the lens holder is welded to the rear housing to secure the lens holder relative to the rear housing. With the lens optically aligned and focused relative to the imager, the radial protrusion within the slot is welded to the lens holder to secure the lens barrel relative to the PCB.

In the illustrated embodiments, the imager assembly is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. In such an application, the other circuit board may have the electrical connector at one side that is aligned with the connector portion of the rear housing for electrically connecting the camera to a vehicle cable (such as a coaxial cable) or wire harness. Optionally, the imager assembly may be part of an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. The camera assembly includes an electrical connector portion that is configured to electrically connect to a vehicle cable or wire harness when the camera is installed at a vehicle.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264, 219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Although shown and described as a vehicular camera, it should be understood that aspects of the cameras, methods, and systems described herein may be suitable for use in other applications, such as non-automotive camera applications or lidar laser modules. For example, aspects of the present disclosure may be suitable for use in the alignment of a laser diode PCB to a collimator (or other type of optic), such as for a vehicular Lidar sensor or the like, and/or may be suitable for use in the alignment of a telephoto lens to a photodetector (or other highly sensitive light sensor).

For example, a lidar sensor assembled utilizing aspects discussed above may detect presence of and/or range to other vehicles and objects, and the sensor and/or sensing system may utilize aspects of the sensors and systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
   an imager printed circuit board (imager PCB), wherein the imager PCB comprises a first side and a second side opposite the first side and separated from the first side by a thickness of the imager PCB, and wherein an imager is disposed at the first side of the imager PCB;
   a lens barrel accommodating a lens, the lens barrel having an inner end;
   a camera housing comprising a first portion and a second portion joined with the first portion via a weld washer;
   wherein the lens barrel is disposed at the first portion of the camera housing;
   wherein the imager PCB is attached at the second portion of the camera housing, and wherein, with the second portion of the camera housing joined with the first portion of the camera housing, the imager at the first side of the imager PCB faces the lens accommodated by the lens barrel;
   wherein, during assembly of the vehicular camera assembly, the second portion of the camera housing engages the first portion of the camera housing when joining the second portion of the camera housing with the first portion of the camera housing;
   wherein, when the second portion of the camera housing is engaging the first portion of the camera housing, the second portion of the camera housing is adjustable relative to the first portion of the camera housing to align the imager and the lens; and
   wherein, with the imager and the lens aligned, (i) the weld washer is laser welded to the second portion of the camera housing and (ii) the weld washer is laser welded to the first portion of the camera housing to join the second portion of the camera housing with the first portion of the camera housing;
   wherein the second portion of the camera housing engages the first portion of the camera housing at a rear surface of the first portion of the camera housing, and wherein the weld washer is laser welded to an outer surface of the second portion of the camera housing and is laser welded to a peripheral region of the rear surface of the first portion of the camera housing; and
   wherein the rear surface of the first portion of the camera housing comprises a protrusion to guide engagement of the second portion of the camera housing with the first portion of the camera housing, and wherein the second portion of the camera housing engages the rear surface of the first portion of the camera housing around the protrusion.

2. The vehicular camera assembly of claim 1, wherein the protrusion corresponds to a shape defined by an inner surface of the second portion of the camera housing.

3. The vehicular camera assembly of claim 1, wherein the outer surface of the second portion of the camera housing comprises a rectangular shape.

4. The vehicular camera assembly of claim 3, wherein the weld washer comprises a rectangular shape corresponding to the rectangular shape of the outer surface of the second portion of the camera housing.

5. The vehicular camera assembly of claim 1, wherein the outer surface of the second portion of the camera housing comprises a cylindrical shape.

6. The vehicular camera assembly of claim 5, wherein the weld washer comprises a circular shape corresponding to the cylindrical shape of the outer surface of the second portion of the camera housing.

7. The vehicular camera assembly of claim 1, wherein the second portion of the camera housing comprises a flange protruding from the outer surface at an edge of the second portion of the camera housing.

8. The vehicular camera assembly of claim 1, wherein a connector protrudes from the second side of the imager PCB and is received within a connector portion of the second portion of the camera housing.

9. The vehicular camera assembly of claim 8, wherein the connector threadedly engages the connector portion of the second portion of the camera housing.

10. The vehicular camera assembly of claim 1, wherein the first portion of the camera housing comprises a rectangular structure, and wherein the second portion of the camera housing engages the first portion of the camera housing at the rectangular structure, and wherein the weld washer is laser welded to the first portion of the camera housing at the rectangular structure.

11. The vehicular camera assembly of claim 1, wherein the first portion of the camera housing comprises a circular structure, and wherein the second portion of the camera housing engages the first portion of the camera housing at the circular structure, and wherein the weld washer is laser welded to the first portion of the camera housing at the circular structure.

12. The vehicular camera assembly of claim 1, wherein the weld washer is tack welded to the second portion of the camera housing and is tack welded to the first portion of the camera housing to join the second portion of the camera housing to the first portion of the camera housing during a first laser welding step, and wherein, after the first laser welding step, the weld washer is further laser welded to the second portion of the camera housing and is further laser welded to the first portion of the camera housing to seal the vehicular camera assembly during a second laser welding step.

13. A method for assembling a vehicular camera assembly, the method comprising:
providing an imager printed circuit board (imager PCB), wherein the imager PCB comprises a first side and a second side opposite the first side and separated from the first side by a thickness of the imager PCB, and wherein an imager is disposed at the first side of the imager PCB;
providing a lens barrel accommodating a lens, the lens barrel having an inner end;
disposing the inner end of the lens barrel at a first portion of a camera housing;
attaching the imager PCB at an inner surface of a second portion of the camera housing;
engaging the second portion of the camera housing with the first portion of the camera housing so that the imager at the first side of the imager PCB faces the lens of the lens barrel;
with the second portion of the camera housing engaging the first portion of the camera housing, adjusting the second portion of the camera housing relative to the first portion of the camera housing to align the imager and the lens; and
with the imager and the lens aligned, laser welding a weld washer to the second portion of the camera housing and laser welding the weld washer to the first portion of the camera housing to join the second portion of the camera housing with the first portion of the camera housing;
wherein engaging the second portion of the camera housing with the first portion of the camera housing comprises engaging the second portion of the camera housing with a rear surface of the first portion of the camera housing, and wherein the weld washer is laser welded to an outer surface of the second portion of the camera housing and is laser welded to a peripheral region of the rear surface of the first portion of the camera housing; and
wherein the rear surface of the first portion of the camera housing comprises a protrusion to guide engagement of the second portion of the camera housing with the first portion of the camera housing, and wherein the second portion of the camera housing engages the rear surface of the first portion of the camera housing around the protrusion.

14. The method of claim 13, wherein the outer surface of the second portion of the camera housing comprises a rectangular shape, and wherein the weld washer comprises a rectangular shape corresponding to the rectangular shape of the outer surface of the second portion of the camera housing.

15. The method of claim 13, wherein the outer surface of the rear housing comprises a cylindrical shape, and wherein the weld washer comprises a circular shape corresponding to the cylindrical shape of the outer surface of the second portion of the camera housing.

16. The method of claim 13, wherein laser welding the weld washer comprises tack welding the weld washer to the second portion of the camera housing and to the first portion of the camera housing to join the second portion of the camera housing to the first portion of the camera housing during a first laser welding step, and wherein the method further comprises, after the first laser welding step, further laser welding the weld washer to the second portion of the camera housing and to the first portion of the camera housing to seal the vehicular camera assembly during a second laser welding step.

17. A vehicular camera assembly, the vehicular camera assembly comprising:
an imager printed circuit board (imager PCB), wherein the imager PCB comprises a first side and a second side opposite the first side and separated from the first side by a thickness of the imager PCB, and wherein an imager is disposed at the first side of the imager PCB;
a lens barrel accommodating a lens, the lens barrel having an inner end;
wherein the lens barrel comprises a radial protrusion;
a camera housing comprising a first portion and a second portion joined with the first portion;
wherein the lens barrel is disposed at the first portion of the camera housing, and wherein the first portion of the camera housing comprises a slot extending longitudinally and partially along the first portion of the camera housing from an engaging end of the first portion of the camera housing;
wherein the second portion of the camera housing is attached at the imager PCB and, with the second portion of the camera housing joined with the first portion of the camera housing, the imager at the first side of the imager PCB faces the lens accommodated by the lens barrel;
wherein the lens barrel is disposed at the first portion of the camera housing such that the radial protrusion of the lens barrel is disposed within the slot of the first portion of the camera housing;
wherein, during assembly of the vehicular camera assembly, the second portion of the camera housing engages the engaging end of the first portion of the camera housing when joining the second portion of the camera housing with the first portion of the camera housing;

wherein, when the second portion of the camera housing is engaging the first portion of the camera housing, the first portion of the camera housing is adjustable relative to the second portion of the camera housing to align the imager and the lens;

wherein, with the radial protrusion of the lens barrel disposed within the slot of the first portion of the camera housing and when the second portion of the camera housing is engaging the first portion of the camera housing, and while the lens barrel is adjusted relative to the first portion of the camera housing to align the imager and the lens, (i) the radial protrusion is movable within the slot of the first portion of the camera housing and (ii) the first portion of the camera housing is movable relative to the second portion of the camera housing;

wherein, with the lens aligned relative to the imager, the first portion of the camera housing is welded to the second portion of the camera housing to join the first portion of the camera housing with the second portion of the camera housing; and wherein, with the lens aligned relative to the imager, the radial protrusion within the slot is welded to the first portion of the camera housing to secure the lens barrel relative to the imager PCB.

18. The vehicular camera assembly of claim 17, wherein the lens barrel comprises two radial protrusions diametrically opposing one another, and wherein the first portion of the camera housing comprises two slots diametrically opposing one another, and wherein the lens barrel is disposed at the first portion of the camera housing such that the two radial protrusions of the lens barrel are disposed within the two slots of the first portion of the camera housing.

19. The vehicular camera assembly of claim 17, wherein the second portion of the camera housing attaches at the imager PCB at a first end of the second portion of the camera housing, and wherein the second portion of the camera housing engages the first portion of the camera housing at a second end of the second portion of the camera housing opposite the first end.

20. The vehicular camera assembly of claim 19, wherein the engaging end of the first portion of the camera housing is welded to the second end of the second portion of the camera housing to join the first portion of the camera housing with the second portion of the camera housing.

21. The vehicular camera assembly of claim 17, wherein, with the first portion of the camera housing welded to the second portion of the camera housing, the radial protrusion is movable within the slot to align the imager and the lens.

* * * * *

UNITED STATES PATENT AND TRADEMARK OFFICE
CERTIFICATE OF CORRECTION

| | | |
|---|---|---|
| PATENT NO. | : 12,174,448 B2 | Page 1 of 1 |
| APPLICATION NO. | : 17/817021 | |
| DATED | : December 24, 2024 | |
| INVENTOR(S) | : Gavin E. Skrocki | |

It is certified that error appears in the above-identified patent and that said Letters Patent is hereby corrected as shown below:

In the Claims

<u>Column 14</u>
Claim 1, Line 30, "lens; and" should be --lens;--

<u>Column 15</u>
Claim 13, Line 59, "lens; and" should be --lens;--

Signed and Sealed this
Twenty-first Day of January, 2025

Coke Morgan Stewart
*Acting Director of the United States Patent and Trademark Office*